United States Patent
Leandro et al.

(10) Patent No.: US 9,651,677 B2
(45) Date of Patent: May 16, 2017

(54) GNSS SIGNAL PROCESSING WITH IONOSPHERIC BRIDGING FOR RECONVERGENCE

(75) Inventors: Rodrigo Leandro, Ottobrunn (DE); Ulrich Vollath, Superior, CO (US); Nicholas Charles Talbot, Ashburton (AU)

(73) Assignee: Trimble Inc., Sunnyvale, CA (US)

( * ) Notice: Subject to any disclaimer, the term of this patent is extended or adjusted under 35 U.S.C. 154(b) by 870 days.

(21) Appl. No.: 14/002,332

(22) PCT Filed: Mar. 11, 2012

(86) PCT No.: PCT/US2012/028670
§ 371 (c)(1),
(2), (4) Date: Aug. 29, 2013

(87) PCT Pub. No.: WO2012/128979
PCT Pub. Date: Sep. 27, 2012

(65) Prior Publication Data
US 2014/0015712 A1    Jan. 16, 2014

Related U.S. Application Data

(60) Provisional application No. 61/466,065, filed on Mar. 22, 2011.

(51) Int. Cl.
*G01S 19/44* (2010.01)
*G01S 19/43* (2010.01)
(Continued)

(52) U.S. Cl.
CPC .............. *G01S 19/44* (2013.01); *G01S 19/04* (2013.01); *G01S 19/43* (2013.01); *G01S 19/07* (2013.01); *G01S 19/09* (2013.01); *G01S 19/32* (2013.01)

(58) Field of Classification Search
CPC .......... G01S 19/44; G01S 19/43; G01S 19/04; G01S 19/07; G01S 19/09
(Continued)

(56) References Cited

U.S. PATENT DOCUMENTS 5,311,194 A    5/1994 Brown
5,323,322 A    6/1994 Mueller et al.
(Continued)

FOREIGN PATENT DOCUMENTS

CN    101964940 A    2/2011
EP    1 862 809 A1    12/2007
(Continued)

OTHER PUBLICATIONS

International Search Report and Written Opinion of the International Searching Authority mailed May 31, 2011 in International Application No. PCT/US2010/002565 (six pages).
(Continued)

*Primary Examiner* — Chuong P Nguyen
(74) *Attorney, Agent, or Firm* — Kilpatrick Townsend & Stockton LLP

(57) ABSTRACT

Methods and apparatus provide for positioning of a rover antenna from GNSS data derived from multi-frequency signals and correction data derived from a network of reference stations. Rover antenna position and multi-frequency ambiguities are estimated at each epoch. An ionospheric filter models variation in ionospheric bias per satellite. A set of ionospheric carrier-phase ambiguities is estimated at least when the multi-frequency ambiguities have attained a predetermined precision. The estimated ionospheric carrier-phase ambiguities are cached. After detecting interruption of signal at the rover antenna and determining reacquisition of signals at the rover antenna, an ionospheric bias per satellite over an interruption interval is
(Continued)

predicted. For each satellite, a cached ionospheric carrier-phase ambiguity is combined with a predicted ionospheric bias to obtain a post-interruption ionospheric ambiguity estimate. The post-interruption ionospheric ambiguity estimates are used to aid estimation of rover antenna position after signal reacquisition.

39 Claims, 14 Drawing Sheets

(51) Int. Cl.
*G01S 19/04* (2010.01)
*G01S 19/09* (2010.01)
*G01S 19/07* (2010.01)
*G01S 19/32* (2010.01)

(58) Field of Classification Search
USPC .......... 342/357.26, 357.27, 357.44, 357.46
See application file for complete search history.

(56) References Cited

U.S. PATENT DOCUMENTS

| | | | |
|---|---|---|---|
| 5,828,336 A | 10/1998 | Yunck et al. | |
| 5,893,044 A | 4/1999 | King et al. | |
| 6,295,021 B1 | 9/2001 | Lichten et al. | |
| 6,324,473 B1 | 11/2001 | Eschenbach | |
| 6,662,107 B2 | 12/2003 | Gronemeyer | |
| 7,117,417 B2 | 10/2006 | Sharpe et al. | |
| 7,256,730 B2* | 8/2007 | Hernandez-Pajares | G01S 19/44 342/357.27 |
| 7,292,185 B2 | 11/2007 | Whitehead et al. | |
| 7,312,747 B2* | 12/2007 | Vollath | G01S 19/44 342/357.27 |
| 7,432,853 B2* | 10/2008 | Vollath | G01S 19/44 342/357.27 |
| 7,498,979 B2 | 3/2009 | Liu et al. | |
| 7,538,721 B2 | 5/2009 | Vollath et al. | |
| 7,541,975 B2 | 6/2009 | Sever et al. | |
| 7,576,690 B2 | 8/2009 | Vollath | |
| 7,589,668 B2 | 9/2009 | Vollath et al. | |
| 7,692,578 B2 | 4/2010 | Vollath et al. | |
| 7,746,272 B2 | 6/2010 | Vollath | |
| 7,755,542 B2 | 7/2010 | Chen et al. | |
| 7,768,449 B2 | 8/2010 | Gaal et al. | |
| 7,868,820 B2* | 1/2011 | Kolb | G01S 19/04 342/357.26 |
| 7,961,143 B2 | 6/2011 | Dai et al. | |
| 7,982,667 B2 | 7/2011 | Vollath et al. | |
| 8,018,377 B2 | 9/2011 | Collins | |
| 8,035,552 B2 | 10/2011 | Dai et al. | |
| 8,130,143 B2 | 3/2012 | Liu et al. | |
| 8,237,609 B2 | 8/2012 | Talbot et al. | |
| 8,242,953 B2 | 8/2012 | Dai et al. | |
| 8,260,551 B2 | 9/2012 | Janky et al. | |
| 8,334,807 B2 | 12/2012 | Gaal et al. | |
| 8,344,946 B2* | 1/2013 | Um | G01S 19/07 342/357.58 |
| 8,368,590 B2 | 2/2013 | Vollath et al. | |
| 8,368,591 B2 | 2/2013 | Talbot et al. | |
| 8,400,351 B2 | 3/2013 | Talbot et al. | |
| 8,542,146 B2 | 9/2013 | Vollath | |
| 8,558,736 B2 | 10/2013 | Talbot et al. | |
| 8,587,475 B2* | 11/2013 | Leandro | G01S 19/40 342/357.27 |
| 8,614,642 B2 | 12/2013 | Talbot et al. | |
| 8,694,250 B2 | 4/2014 | Talbot et al. | |
| 8,704,708 B2 | 4/2014 | Vollath | |
| 8,704,709 B2 | 4/2014 | Vollath et al. | |
| 9,128,176 B2* | 9/2015 | Seeger | G01S 19/04 |
| 9,164,174 B2* | 10/2015 | Chen | |
| 2003/0016147 A1 | 1/2003 | Evans | |
| 2003/0048218 A1 | 3/2003 | Milnes et al. | |
| 2005/0001763 A1 | 1/2005 | Han et al. | |
| 2005/0055160 A1 | 3/2005 | King | |
| 2005/0064878 A1 | 3/2005 | O'Meagher | |
| 2005/0101248 A1 | 5/2005 | Vollath | |
| 2007/0063894 A1 | 3/2007 | Yu | |
| 2007/0200753 A1 | 8/2007 | Fuchs et al. | |
| 2008/0036654 A1 | 2/2008 | Hansen et al. | |
| 2008/0192242 A1 | 8/2008 | Nichols | |
| 2008/0204312 A1 | 8/2008 | Euler | |
| 2008/0238768 A1 | 10/2008 | Nasworthy | |
| 2008/0258966 A1 | 10/2008 | Sugimoto et al. | |
| 2009/0027264 A1 | 1/2009 | Chen et al. | |
| 2009/0098880 A1 | 4/2009 | Lindquist | |
| 2009/0109090 A1 | 4/2009 | Vollath | |
| 2009/0135057 A1 | 5/2009 | Vollath et al. | |
| 2009/0140914 A1 | 6/2009 | Talbot et al. | |
| 2009/0179792 A1 | 7/2009 | Remondi | |
| 2009/0179793 A1 | 7/2009 | Remondi | |
| 2009/0184869 A1* | 7/2009 | Talbot | G01S 19/04 342/357.27 |
| 2009/0224969 A1 | 9/2009 | Kolb | |
| 2009/0237298 A1 | 9/2009 | Vollath et al. | |
| 2009/0322600 A1 | 12/2009 | Whitehead et al. | |
| 2010/0033370 A1 | 2/2010 | Lopez et al. | |
| 2010/0141515 A1 | 6/2010 | Doucet et al. | |
| 2010/0156709 A1 | 6/2010 | Zhang et al. | |
| 2010/0177806 A1 | 7/2010 | Normark et al. | |
| 2010/0214162 A1 | 8/2010 | Talbot et al. | |
| 2010/0245168 A1 | 9/2010 | Rollet et al. | |
| 2010/0253575 A1 | 10/2010 | Vollath | |
| 2011/0140959 A1 | 6/2011 | Vollath | |
| 2011/0148698 A1 | 6/2011 | Vollath | |
| 2011/0156949 A1 | 6/2011 | Vollath et al. | |
| 2011/0187590 A1 | 8/2011 | Leandro | |
| 2011/0267228 A1 | 11/2011 | Talbot et al. | |
| 2011/0279314 A1 | 11/2011 | Talbot et al. | |
| 2011/0285587 A1 | 11/2011 | Vollath et al. | |
| 2012/0026038 A1 | 2/2012 | Vollath | |
| 2012/0092213 A1 | 4/2012 | Chen | |
| 2012/0119944 A1 | 5/2012 | Chen | |
| 2012/0154210 A1 | 6/2012 | Landau et al. | |
| 2012/0154214 A1 | 6/2012 | Leandro | |
| 2012/0154215 A1 | 6/2012 | Vollath et al. | |
| 2012/0162007 A1 | 6/2012 | Leandro et al. | |
| 2012/0163419 A1 | 6/2012 | Seeger | |
| 2012/0229332 A1 | 9/2012 | Vollath et al. | |
| 2012/0286991 A1 | 11/2012 | Chen et al. | |
| 2012/0293367 A1 | 11/2012 | Chen et al. | |
| 2012/0306694 A1 | 12/2012 | Chen et al. | |
| 2013/0044026 A1 | 2/2013 | Chen et al. | |
| 2013/0335266 A1 | 12/2013 | Vollath et al. | |
| 2014/0002300 A1* | 1/2014 | Leandro | G01S 19/44 342/357.27 |
| 2014/0015712 A1 | 1/2014 | Leandro et al. | |
| 2014/0070992 A1* | 3/2014 | Hernandez-Pajares | G01S 19/44 342/357.395 |

FOREIGN PATENT DOCUMENTS

| | | |
|---|---|---|
| EP | 2 037 291 A1 | 3/2009 |
| WO | 03/038464 A2 | 5/2003 |
| WO | 2005/043186 A2 | 5/2005 |
| WO | 2007/082038 A1 | 7/2007 |
| WO | 2010/042441 A1 | 4/2010 |
| WO | 2010/096159 A2 | 8/2010 |

OTHER PUBLICATIONS

International Search Report and Written Opinion of the International Searching Authority mailed May 31, 2011 in International Application No. PCT/US2010/002564 (seven pages).
International Search Report and Written Opinion of the International Searching Authority mailed May 30, 2011 in International Application No. PCT/US2010/002563 (six pages).
International Search Report and Written Opinion of the International Searching Authority mailed May 26, 2011 in International Application No. PCT/US2010/002562 (six pages).

(56) References Cited

OTHER PUBLICATIONS

International Search Report and Written Opinion of the International Searching Authority mailed May 31, 2011 in International Application No. PCT/US2010/002581 (six pages).
International Search Report and Written Opinion of the International Searching Authority mailed Sep. 27, 2011 in International Application No. PCT/US2011/024733 (ten pages).
International Search Report and Written Opinion of the International Searching Authority mailed Oct. 6, 2011 in International Application No. PCT/US2011/024743 (ten pages).
International Search Report and Written Opinion of the International Searching Authority mailed Sep. 26, 2011 in International Application No. PCT/US2011/024763 (ten pages).
International Search Report and Written Opinion of the International Searching Authority mailed Oct. 12, 2012 in International Application No. PCT/US2012/029694 (fourteen pages).
International Search Report and Written Opinion of the International Searching Authority mailed Oct. 16, 2012 in International Application No. PCT/US2012/028670 (eight pages).
International Search Report and Written Opinion of the International Searching Authority mailed Sep. 5, 2012 in International Application No. PCT/US2012/028671 (eight pages).
S. Banville et al., "Satellite and Receiver Phase Bias Calibration for Undifferenced Ambiguity Resolution," Proceedings of the 2008 National Technical Meeting of the Institute of Navigation, San Diego, CA, Jan. 2008, pp. 711-719.
Y. Bar-Sever et al., "A new model for GPS yaw attitude," Journal of Geodesy, vol. 70, No. 11, Nov. 1996, pp. 714-723 (abstract only).
G. Bierman, Factorization Methods for Discrete Sequential Estimation, Academic Press, Inc., 1977, 129 pp.
S. Bisnath et al., "Precise Orbit Determination of Low Earth Orbiters with GPS Point Positioning," Proceedings of the 2001 National Technical Meeting of the Institute of Navigation, Long Beach, CA, Jan. 2001, pp. 725-733.
P. Collins, "Isolating and Estimating Undifferenced GPS Integer Ambiguities," Proceedings of the 2008 National Technical Meeting of the Institute of Navigation, San Diego, CA, Jan. 2008, pp. 720-732.
P. Collins et al., "Precise Point Positioning with Ambiguity Resolution using the Decoupled Clock Model," Proceedings of the 21st International Technical Meeting of the Satellite Division of the Institute of Navigation (ION GNSS 2008), Savannah, GA, Sep. 2008, pp. 1315-1322.
P. Collins et al., "Accessing and Processing Real-Time GPS Corrections for Precise Point Positioning . . . Some User Considerations," Proceedings of the 18th International Technical Meeting of the Satellite Division of the Institute of Navigation (ION GNSS 2005), Long Beach, CA, Sep. 2005, pp. 1483-1491.
Y. Gao et al., "A New Method for Carrier-Phase-Based Precise Point Positioning", Navigation, Journal of the Institute of Navigation, vol. 49, No. 2, Summer 2002, pp. 109-116.
"GNSS Solutions: Precise Point Positioning and Its Challenges, Aided-GNSS and Signal Tracking," Inside GNSS, Nov./Dec. 2006, pp. 16-21.
M. Gabor et al., "Satellite-Satellite Single-Difference Phase Bias Calibration as Applied to Ambiguity Resolution", Navigation, Journal of the Institute of Navigation, vol. 49, No. 4, Winter 2002-2003, pp. 223-247.
M. Ge et al., "Resolution of GPS carrier-phase ambiguities in Precise Point Positioning (PPP) with daily observations," Journal of Geodesy, Jul. 2008, vol. 82, Issue 7, pp. 389-399.
A. Hauschild et al., "Real-time Clock Estimation for Precise Orbit Determination of LEO-Satellites," Proceedings of the 21st International Technical Meeting of the Satellite Division of the Institute of Navigation (ION GNSS 2008), Savannah, GA, Sep. 2008, pp. 581-589.
P. Heroux et al., "GPS Precise Point Positioning Using IGS Orbit Products," Phys. Chem. Earth (A), vol. 26, No. 6-8. pp. 573-578, 2001.
P. Heroux et al., "GPS Precise Point Positioning with a Difference," presented at Geomeatics '95, Ottawa, Ontario, Canada, Jun. 13-15, 1995, 11 pp.
S. Hutsell, "Relating the hadamard variance to MCS Kalman filter clock estimation," in Proceedings of the 27th Annual Precise Time and Time Interval (PTTI) Applications and Planning Meeting, p. 293, San Diego, Calif, USA, Dec. 1995.
IERS Conventions (2003), International Earth Rotation and Reference Systems Service, IERS Technical Note No. 32, 127 pp.
"IGS Product Table—updated for 2009," from http://igsch.jpl.nasa.gov/components/prods.html on Aug. 19, 2009, three pages.
J. Kouba, "A simplified yaw-attitude model for eclipsing GPS satellites," GPS Solutions, Jan. 2009, vol. 13, Issue 1, pp. 1-12.
J. Kouba, "A guide to using International GPS Service (IGS) Products," International GPS Service, Feb. 2003, 31 pp.
J. Kouba et al., "Precise Point Positioning Using IGS Orbit and Clock Products," GPS Solutions, Oct. 2001, vol. 5, Issue 2, pp. 12-28.
D. Lapucha et al., "Comparison of the Two Alternate Methods of Wide Area Carrier Phase Positioning," Proceedings of the 17th International Technical Meeting of the Satellite Division of the Institute of Navigation (ION GNSS 2004), Long Beach, CA, Sep. 2004, pp. 1864-1871.
D. Laurichesse et al., "Real Time Zero-difference Ambiguities Fixing and Absolute RTK," Proceedings of the 2008 National Technical Meeting of the Institute of Navigation, San Diego, CA, Jan. 2008, pp. 747-755.
D. Laurichesse et al., "Integer Ambiguity Resolution on Undifferenced GPS Phase Measurements and its Application to PPP," Proceedings of the 20th International Technical Meeting of the Satellite Division of the Institute of Navigation (ION GNSS 2007), Fort Worth, TX, Sep. 2007, pp. 839-848.
R. Leandro et al., "Wide Area Based Precise Point Positioning," Proceedings of the 19th International Technical Meeting of the Satellite Division of the Institute of Navigation (ION GNSS 2006), Fort Worth, TX, Sep. 2006, pp. 2272-2278.
R. Leandro et al., "UNB Neutral Atmosphere Models: Development and Performance," Proceedings of the 2006 National Technical Meeting of the Institute of Navigation, Monterey, CA, Jan. 2006, pp. 564-573.
S. Lo et al., "GNSS Album: Images and Spectral Signature of the New GNSS Signals," Inside GNSS, May/Jun. 2006, pp. 46-56.
W. Melbourne, "The case for ranging in GPS based geodetic systems," Proceedings 1st International Symposium on Precise Positioning with the Global Positioning system, U.S. Department of Commerce, Rockville, Maryland, Apr. 15-19, vol. 1, pp. 373-386.
L. Mervart et al., "Precise Point Positioning with Ambiguity Resolution in Real-Time," Proceedings of the 21st International Technical Meeting of the Satellite Division of the Institute of Navigation (ION GNSS 2008), Savannah, GA, Sep. 2008, pp. 397-405.
Y. Mireault et al., "Online Precise Point Positioning," GPS World, Sep. 2008, pp. 59-64.
A. Niell, "Global mapping functions for the atmosphere delay at radio wavelengths," Journal of Geophysical Research, vol. 101, No. B2, pp. 3227-3246, Feb. 10, 1996.
S. Schaer, [IGSMAIL-287]: Monitoring (P1-C1) code biases, IGS Electronic Mail Message No. 2827,May 9, 2000, two pages.
G. Seeber, Satellite Geodesy, 2d. Ed., 2003, p. 31.
P. Tetrault et al., "CSRS-PPP: An Internet Service for GPS User Access to the Canadian Spatial Reference Frame," Geomatica, vol. 59, No. 1, 2005, pp. 17-28.
A. Van Dierendonck et al., "Relationship Between Allan Variances and Kalman Filter Parameters," Proceedings of the 16th Annual Precise Time and Time Interval (PTTI) Applications and Planning Meeting, NASA Goddard Space Flight Center, Nov. 1984, pp. 273-293.
S. Verhagen, "The GNSS integer ambiguities: estimation and validation" PhD dissertation, Delft University of Technology, Publications on Geodesy, vol. 58, Netherlands Geodetic Commission, Delft, 2005, 196 pp.
G. Wubbena, "Software Developments for Geodetic Positioning with GPS Using TI 4100 Code and Carrier Measurements," in Goad

(56) References Cited

OTHER PUBLICATIONS

C.C. (ed), Proc. of First Int. Sym. on Precise Position. with GPS Rockville, Maryland, pp. 403-412, (1985).
J. Zumberge et al., "Precise point positioning for the efficient and robust analysis of GPS data from large networks," Journal of Geophysical Research: Solid Earth, vol. 102, Issue B3, pp. 5005-5017, Mar. 10, 1997.
Extended European Search Report of Aug. 4, 2014 for European Patent Application 12761111.9, 8 pages.
D. Odijk, "Improving the Speed of CORS Network RTK Ambiguity Resolution" Position Location and Navigation Symposium (Plans), 2010 IEEE / ION, IEEE, Piscataway, NJ, May 4, 2010, pp. 79-84.
Horng-Yue Chen, "An Instantaneous Ambiguity Resolution Procedure Suitable for Medium-Scale GPS Reference Station Networks" GPS 2000—Proceedings of the 13th International Technical Meeting of the Satellite Division of the Institute of Navigation, Manassas, VA 20109, Sep. 22, 2000, pp. 1061-1070.

\* cited by examiner

GNSS SIGNAL PROCESSING WITH IONOSPHERIC BRIDGING FOR RECONVERGENCE

CROSS REFERENCE TO RELATED APPLICATIONS

This application is a U.S. National Stage of PCT Application No. PCT/US2012/28670, filed on Mar. 11, 2012, which claims benefit of U.S. Provisional Patent Application No. 61/466,065, filed on Mar. 22, 2011, the contents of both applications are incorporated herein by reference in their entity for all purposes.

The following are related hereto and incorporated herein in their entirety by this reference: U.S. Provisional Application for Patent No. 61/277,184 filed 19 Sep. 2009; International Patent Application PCT/US2010/02565 filed 19 Sep. 2010; International Patent Application PCT/US2010/02564 filed 19 Sep. 2010; International Patent Application PCT/US2010/02563 filed 19 Sep. 2010; International Patent Application PCT/US2010/02562 filed 19 Sep. 2010; International Patent Application PCT/US2010/02581 filed 19 Sep. 2010; U.S. Provisional Application for Patent No. 61/337,980 filed 14 Feb. 2010; International Patent Application PCT/US2011/24733 filed 14 Feb. 2011; International Patent Application PCT/US2011/24743 filed 14 Feb. 2011; International Patent Application PCT/US2011/24763 filed 14 Feb. 2011; U.S. Provisional Application for Patent No. 61/442,680 filed 14 Feb. 2011; International Patent Application PCT/US2009/059552 filed 5 Oct. 2009; U.S. Provisional Application for Patent No. 61/195,276 filed 6 Oct. 2008; International Patent Application PCT/US/2009/004471 filed 5 Aug. 2009; International Patent Application PCT/US/2009/004473 filed 5 Aug. 2009; International Patent Application PCT/US/2009/004474 filed 5 Aug. 2009; International Patent Application PCT/US/2009/004472 filed 5 Aug. 2009; International Patent Application PCT/US/2009/004476 filed 5 Aug. 2009; U.S. Provisional Application for Patent No. 61/189,382 filed 19 Aug. 2008; U.S. patent application Ser. No. 12/224,451 filed 26 Aug. 2008, United States Patent Application Publication US 2009/0027625 A1; International Patent Application PCT/US07/05874 filed 7 Mar. 2007, International Publication No. WO 2008/008099 A2; U.S. patent application Ser. No. 11/988,763 filed 14 Jan. 2008, United States Patent Application Publication US 2009/0224969 A1; International Patent Application No. PCT/US/2006/034433 filed 5 Sep. 2006, International Publication No. WO 2007/032947 A1; U.S. Pat. No. 7,432,853 granted 7 Oct. 2008; International Patent Application No. PCT/US2004/035263 filed 22 Oct. 2004 and International Publication Number WO 2005/045463 A1; U.S. Pat. No. 6,862,526 granted 1 Mar. 2005; and U.S. Provisional Application for Patent No. 61/396,676, filed 30 May 2010.

TECHNICAL FIELD

The present invention relates to the field of Global Navigation Satellite Systems (GNSS). More particularly, the present invention relates to methods and apparatus for processing of GNSS data to provide high precision positioning with rapid solution convergence.

BACKGROUND ART

Global Navigation Satellite Systems (GNSS) include the Global Positioning System (GPS), the Glonass system, the proposed Galileo system, the proposed Compass system, and others. Each GPS satellite transmits continuously using two radio frequencies in the L-band, referred to as L1 and L2, at respective frequencies of 1575.42 MHz and 1227.60 MHz. Two signals are transmitted on L1, one for civil users and the other for users authorized by the United States Department of Defense (DoD). One signal is transmitted on L2, intended only for DoD-authorized users. Each GPS signal has a carrier at the L1 and L2 frequency, a pseudo-random noise (PRN) code, and satellite navigation data. Two different PRN codes are transmitted by each satellite: a coarse acquisition code and a precision (P/Y) code which is encrypted for DoD-authorized users. Each C/A code is a unique sequence of 1023 bits, which is repeated each millisecond. New GPS satellites are able to broadcast on 3 frequencies. Other GNSS systems likewise have satellites which transmit multiple signals on multiple carrier frequencies.

FIG. 1 schematically illustrates a typical prior-art scenario to determine the position of a mobile receiver (rover). Rover 105 receives GNSS signals from one or more satellites in view, such as satellites 110, 115, 120, 125 and 130 shown. The signals pass through the earth's atmosphere 160, the upper portion is called the ionosphere, while the lower portion of the atmosphere is referred to as the troposphere. The multi-frequency GNSS PRN code and carrier phase signals are simultaneously tracked by the rover receiver and by one or more GNSS reference receivers 135 and 140. The ionosphere causes a dispersive effect whereby the code is delayed, while the carrier phase is advanced. The troposphere delays the signals with the magnitude of the effect dependent on the prevailing atmospheric temperature, pressure, relative humidity and precipitable water vapor content.

Each satellite broadcasts a prediction of its expected orbital trajectory in a navigation message. The navigation message also includes a prediction of the expected satellite clock behavior. The satellite clock, orbit and atmospheric errors can be considered as causing an apparent shift in the satellite locations 110->170, 115->175, 120->180, 125-185, 130-190, as depicted in FIG. 1.

Prior-art network GNSS processing techniques such as described in U.S. Provisional Application for Patent No. 61/277,184 filed 19 Sep. 2009, enable satellite and atmospheric errors to be estimated by first tracking the satellite signals at a network of reference stations, spatially distributed globally and/or regionally. The satellite orbit/clock and atmospheric errors are estimated in a network processor such as 145, in FIG. 1. The satellite correction data is then encoded and transmitted via antenna 150, for later reception and use by one or more rovers 105

In prior-art rover processing techniques such as described in International Patent Application PCT/US2010/02562 filed 19 Sep. 2010, the rover GNSS data is combined with the GNSS network correction data at a plurality of epochs in order to estimate the rover antenna position plus nuisance parameters such as a set of multi-frequency (carrier phase) ambiguities and tropospheric biases FIG. 2 is a block diagram of a typical integrated receiver system 200 with GNSS rover 105 and communications antenna 202. Receiver system 200 can serve as rover 105 or as a reference station. Receiver system 200 includes a GNSS receiver 205, a computer system 210 and one or more communications links 215. Computer system 210 includes one or more processor(s) 220, one or more data storage elements 225, program code 230 for controlling the processor(s) 220, and user input/output devices 235 which may include one or more output devices 240 such as a display or speaker or printer and one or more devices 245 for receiving user input such as a keyboard or touch pad or mouse or microphone.

FIG. 3 illustrates the horizontal position accuracy convergence over time of a GNSS rover position solution based on global GNSS network correction data and precise satellite orbit and clock data. The x-axis represents time in minutes, while the y-axis represents the horizontal position accuracy in centimeters. The x-y axes are denoted 405. The trace of horizontal position accuracy is denoted 410. Many high precision applications require for example 2.5 cm (1 inch) horizontal position accuracy; this threshold is indicated by the dashed horizontal line 415. The convergence time (420) needed to achieve the position threshold is around 18 minutes in this example. A tracking interruption at the rover receiver occurs around time 40 minutes (denoted 425). The tracking interruption leads to a reconvergence period 430.

Based on GPS satellites alone, it is common to have convergence times of 10-30 minutes to achieve a horizontal position accuracy of 2.5 cm. Many GNSS applications need cm-level accuracy and therefore the convergence time hinders the usefulness of the system. It is common for satellite tracking to be interrupted from time-to-time on one or more satellites at the rover, particularly when the rover is moving. If the number of tracked satellites drops below 4, the solution is converged again as shown in FIG. 3.

In prior-art processing techniques, Geng, J, et al, 2010, *Rapid re-convergences to ambiguity-fixed solutions in precise point positioning*, Journal of Geodesy, Vol 84, pp 705-714, a technique is described for improving the reconvergence of precise point positioning following tracking interruptions. Specifically, the wide-lane ambiguities are estimated first with the aid of ionospheric-free code measurements. Next a linear time-window-based prediction of the ionospheric bias on each cycle slipped satellite is made. The predicted ionospheric bias is used to limit the search space of narrow-lane phase ambiguities. The reported results from ibid, show re-convergence times of 5 seconds in most tests. Few details are provided on the filtering scheme used for the PPP solution.

In prior-art processing techniques, Banville, S, and Langley, R. B., 2010, *Instantaneous Cycle-Slip Correction for Real-Time PPP Applications*, NAVIGATION, Journal of the US Institute of Navigation, Vol 57 No 4, Winter, pp 325-334, describe a way of repairing cycle slips in Precise Point Positioning (PPP) applications based on time-differenced phase measurements. First an attempt is made to fix the time-differenced wide-lane carrier phase ambiguities following an interruption to satellite tracking. Next the known wide-lane ambiguities are used in conjunction with the assumed time-wise change in ionospheric bias to fix the L1 and L2 on each satellite during the tracking interruption.

Precise Point Positioning (PPP) techniques involve careful modeling of various error sources affecting satellite measurements. Real-time rover processors are often limited in terms of size, weight and power and therefore careful consideration must be given to efficient data processing techniques that minimize compute power. The prior-art methods for cycle slip repair in PPP applications do not mention the use of distributed filtering for the underlying state parameter estimation.

Improved GNSS processing methods and apparatus are desired, especially to achieve faster and more efficient convergence to a solution, improved accuracy and/or greater availability.

SUMMARY

The following invention presents a way of reducing convergence/reconvergence times by taking advantage of:

predictability of the tropospheric biases over short tracking outages (tropo-bridging);

predictability of the satellite ionospheric biases over short tracking outages (iono-bridging);

predetermined knowledge of the user location (known position input).

Methods and apparatus provide for positioning of a rover antenna from GNSS data derived from multi-frequency signals and correction data derived from a network of reference stations. Rover antenna position and multi-frequency ambiguities are estimated at each epoch. An ionospheric filter models variation in ionospheric bias per satellite. A set of ionospheric carrier-phase ambiguities is estimated at least when the multi-frequency ambiguities have attained a predetermined precision. The estimated ionospheric carrier-phase ambiguities are cached. After detecting interruption of signal at the rover antenna and determining reacquisition of signals at the rover antenna, an ionospheric bias per satellite over an interruption interval is predicted. For each satellite, a cached ionospheric carrier-phase ambiguity is combined with a predicted ionospheric bias to obtain a post-interruption ionospheric ambiguity estimate. The post-interruption ionospheric ambiguity estimates are used to aid estimation of rover antenna position after signal reacquisition.

BRIEF DESCRIPTION OF DRAWING FIGURES

Embodiments in accordance with the invention are described herein with reference to the drawing Figures, in which:

FIG. 1 schematically illustrates a GNSS rover operating with correction data in the presence of satellite error sources;

FIG. 2 schematically illustrates a typical integrated GNSS receiver system;

FIG. 3 shows convergence and reconvergence of horizontal position accuracy over a tracking interruption;

FIG. 4 schematically illustrates the use of global corrections at a rover receiver FIG. 5 is a schematic diagram of a factorized-array multi-carrier ambiguity resolution (FAMCAR) filtering scheme used for processing of GNSS signal data;

Figure 12:
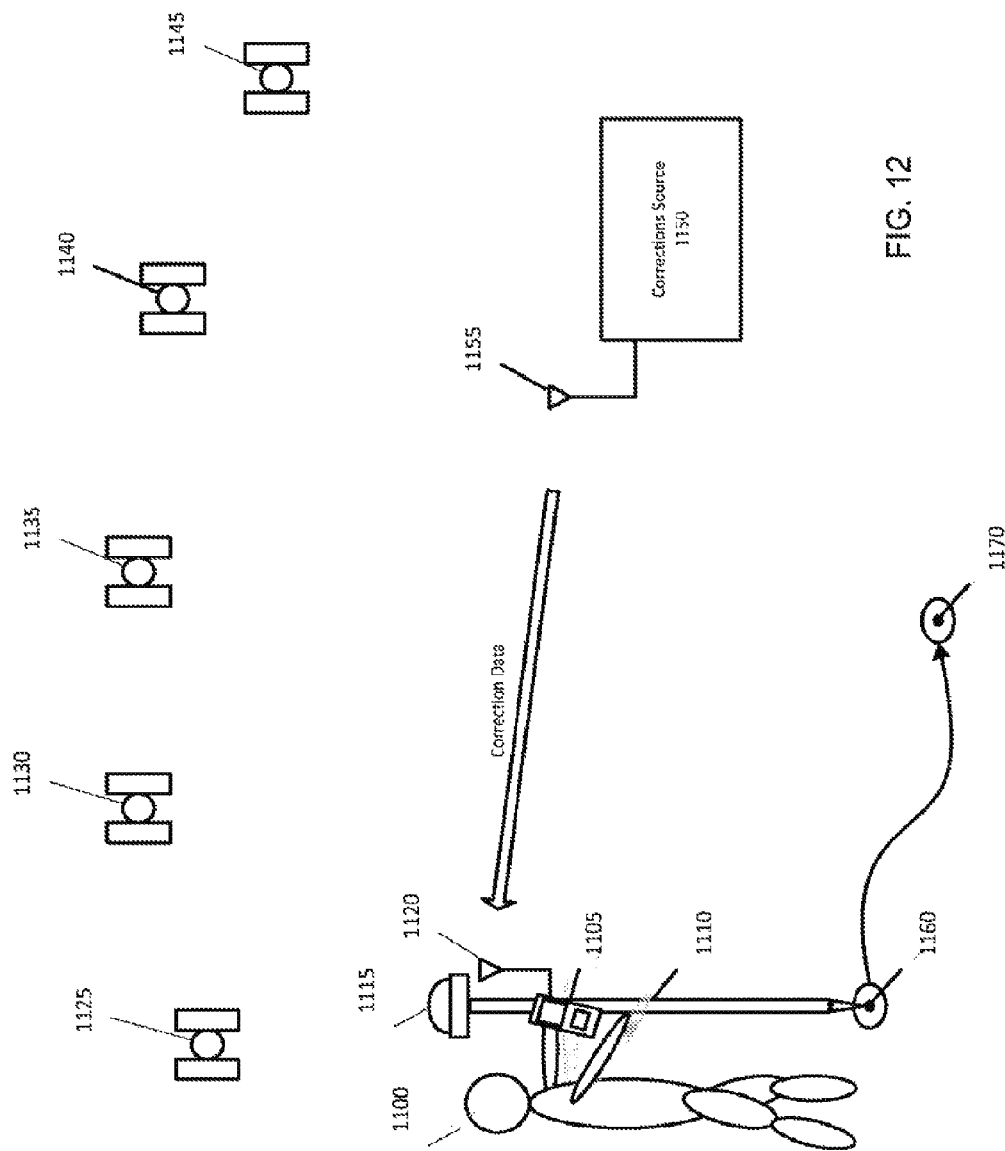
Figure 13:
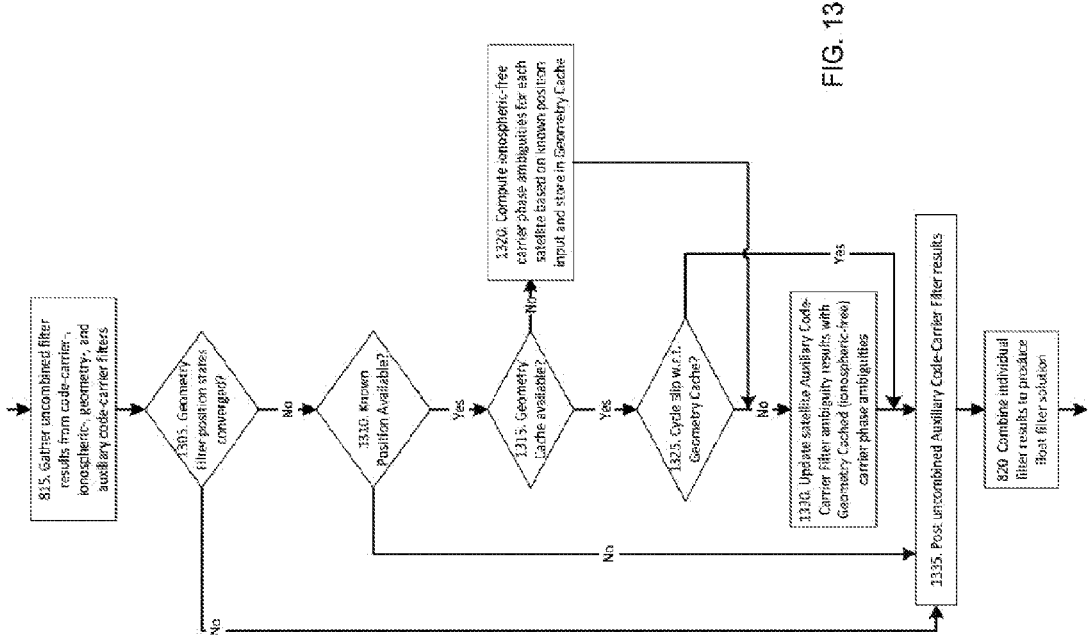
Figure 14:
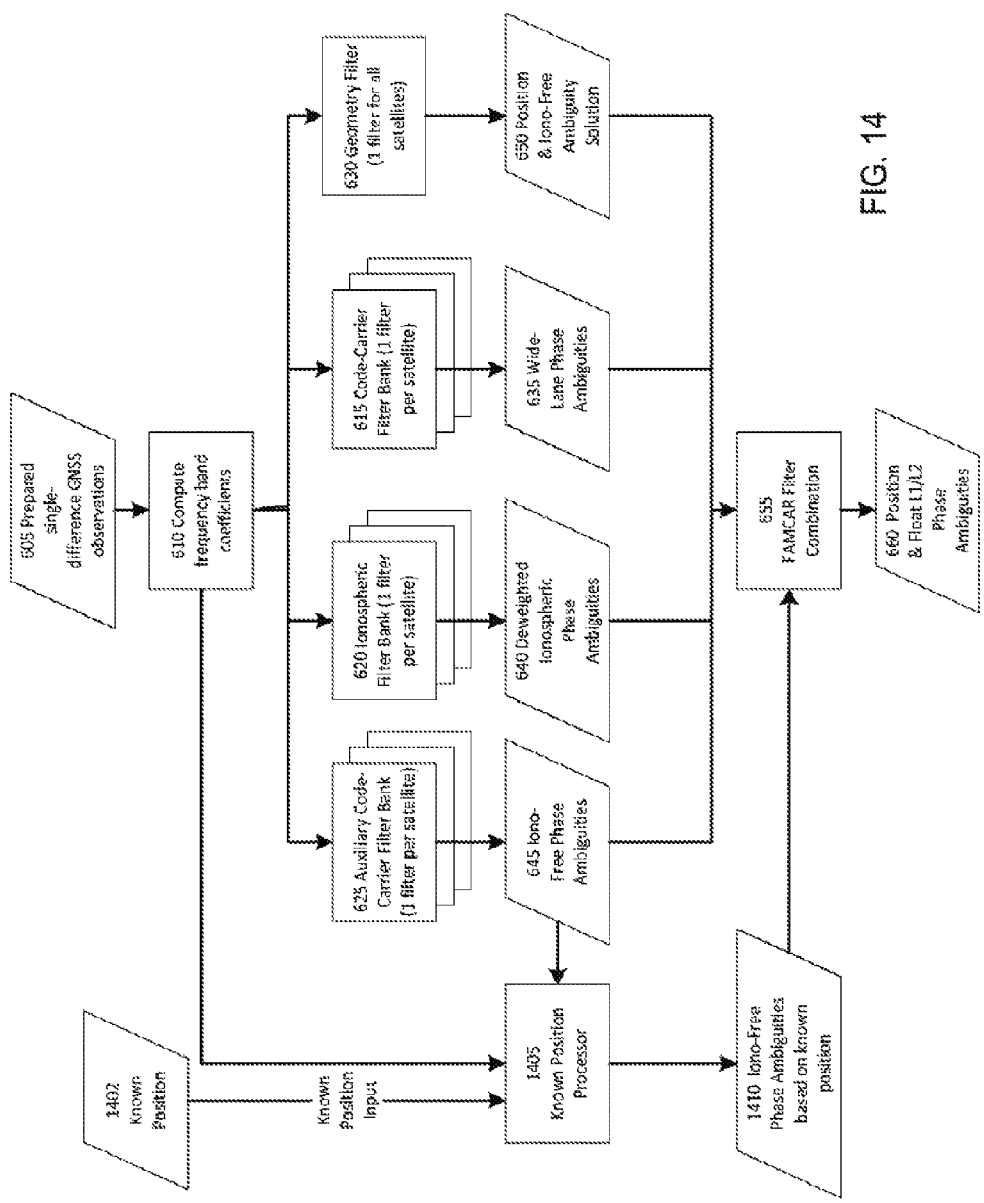

FIG. 12 schematically illustrates a surveying scenario using a GNSS rover with correction data;

FIG. 13 illustrates a known-position aiding process in accordance with some embodiments of the invention; and FIG. 14 schematically illustrates the use of known-position aiding in the FAMCAR process in accordance with some embodiments of the invention.

DETAILED DESCRIPTION

Global Virtual Reference Station (GVRS) Positioning Principles

Overview

Figure 4:
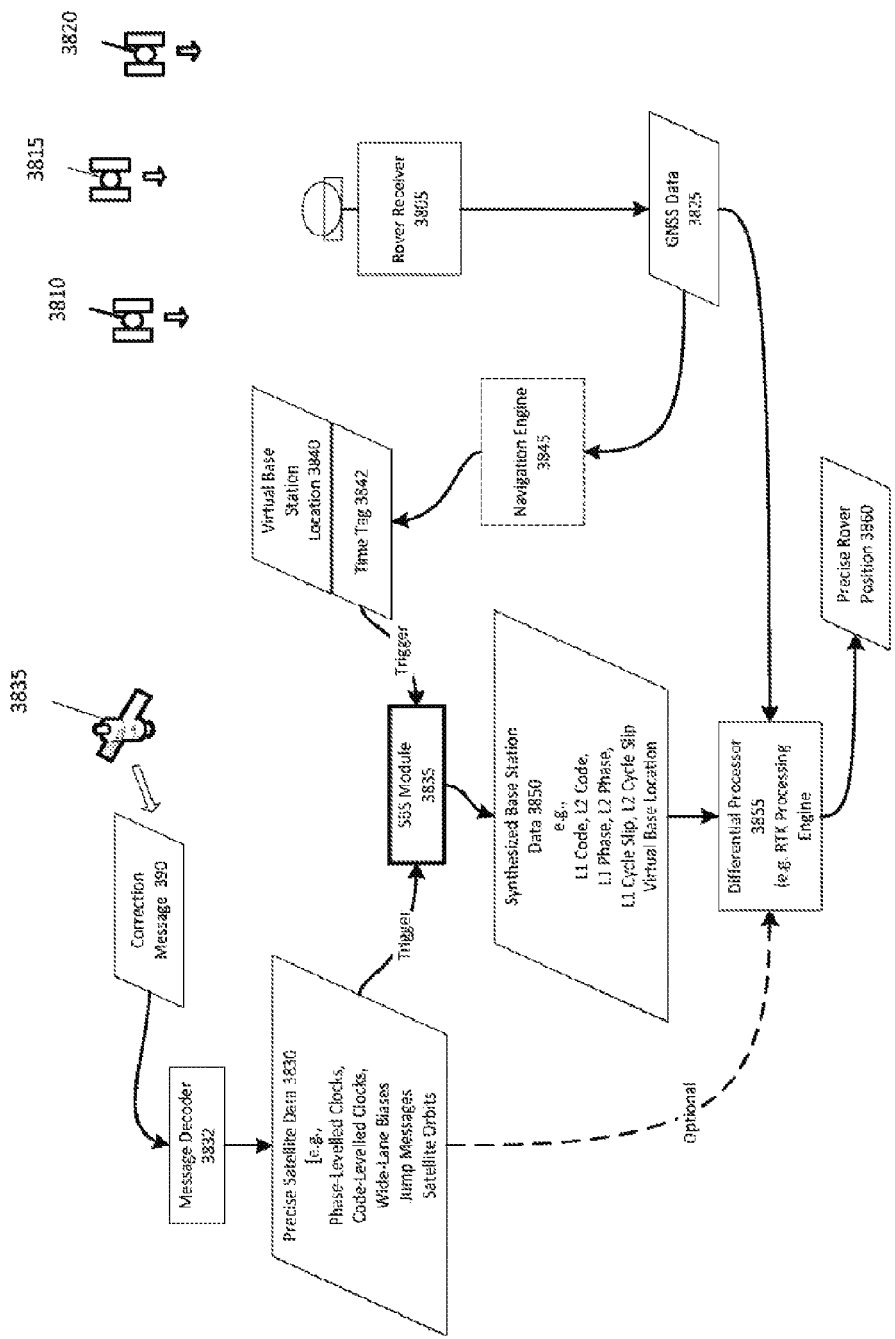

FIG. 4 shows an embodiment of Global Virtual Reference Station (GVRS) rover processing with GNSS satellite corrections (taken from FIG. 38 of U.S. Provisional Application for Patent No. 61/277,184 filed 19 Sep. 2009). Rover receiver 3805 receives GNSS signals from multiple GNSS satellites, of which three are shown at 3810, 3815, 3820. Receiver 3805 derives GNSS data 3825 from code observations and carrier-phase observations of the GNSS signals over multiple epochs.

Precise satellite data 3830 for the GNSS satellites are received, via a correction message broadcast by a communication satellite 3835 in this case, or by other means, such as wireless Internet. The correction messages are decoded by a message decoder 3832. A Synthesized Base Station (SBS) module 3835 receives the precise satellite data 3830 and also receives information which it can use as a virtual base location, such as an approximate rover position with time tag 3842 generated by an optional navigation engine 3845. The approximate rover position is optionally obtained from other sources as described below.

SBS module 3835 uses the precise satellite data 3830 and the approximate rover position with time tag 3842 to synthesize base station data 3850 for the virtual base location. The base station data 3850 comprises, for example, synthesized observations of L1 code, L2 code, L1 carrier-phase and L2 carrier-phase, and optionally includes information on L1 cycle slip, L2 cycle slip and the virtual base location.

The synthesized base station data 3850 is delivered to the RTK processing engine 3855, and combined with locally collected GNSS data 3825. The combined GNSS data can be processed in a manner similar to conventional single-base real-time kinematic data in order to produce an estimate of the rover position 3860.

FAMCAR

The Factorized Multi-Carrier Ambiguity (FAMCAR) algorithm uses a distributed filtering strategy for estimating the carrier phase ambiguities, position and other parameters needed in high-precision GNSS data processing. The FAMCAR approach was originally designed for efficient single-baseline RTK processing as described in U.S. Pat. No. 7,432,853, Vollath, U., *Ambiguity Estimation of GNSS Signals for Three or more Carriers*. However the FAMCAR approach can readily accommodate single-baseline, virtual base processing, and global virtual reference station (GVRS) processing as described below.

Figure 5:
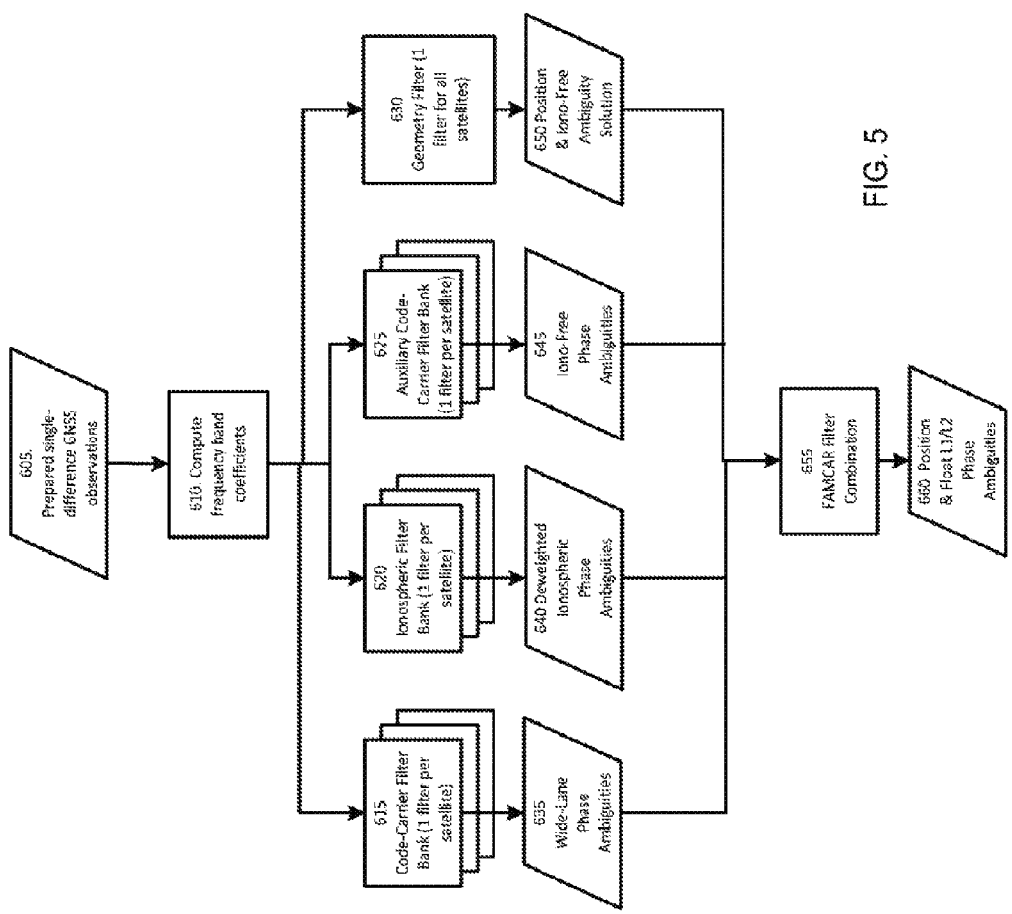

FIG. 5 schematically illustrates the distributed filtering scheme used for FAMCAR-based GVRS processing. Table 1 presents a summary of the observation types processed in each filter component.

TABLE 1

Summary of observation types applied to FAMCAR component filters for GVRS processing.

| Filter | GNSS observation type processed | GPS L1 Band Coefficient α | GPS L2 Band Coefficient β |
|---|---|---|---|
| Code-Carrier | Wide-lane phase combination | +1 | −1 |
| | Narrow-lane code combination | +1 | +1 |
| Ionospheric | Ionospheric phase combination | $+_{L1}\lambda$ | $-_{L2}\lambda$ |
| Auxiliary Code-Carrier | Ionospheric-free phase combination | $_{L2}\lambda^2/(_{L2}\lambda^2 - _{L1}\lambda^2)$ | $-_{L1}\lambda_{L2}\lambda/(_{L2}\lambda^2 - _{L1}\lambda^2)$ |
| | Ionospheric-free code combination | $_{L2}\lambda^2/(_{L2}\lambda^2 - _{L1}\lambda^2)$ | $-_{L1}\lambda^2/(_{L2}\lambda^2 - _{L1}\lambda^2)$ |
| Geometry | Ionospheric-free phase combination | $_{L2}\lambda^2/(_{L2}\lambda^2 - _{L1}\lambda^2)$ | $-_{L1}\lambda_{L2}\lambda/(_{L2}\lambda^2 - _{L1}\lambda^2)$ | with multi-frequency phase combinations formed as follows:

$$_c\Phi = \alpha_{L1}\Phi + \beta_{L2}\Phi \quad (1)$$

and multi-frequency code combinations formed as follows:

$$_cR = \alpha_{L1}R + \beta_{L2}R \quad (2)$$

where:

α, β L1 and L2 measurement band coefficients respectively, $_{L1}\Phi$, $_{L2}\Phi$ L1 and L2 carrier phase measurements respectively, $_c\Phi$ Carrier phase combination, $_{L1}\lambda$, $_{L2}\lambda$ L1 and L2 carrier wavelengths respectively, $_{L1}R$, $_{L2}R$ L1 and L2 code measurements respectively, $_cR$ Code combination.

In FIG. 5 single-differenced GNSS observations 605, formed from the combined Synthesized Base Station Data and locally collected rover GNSS data, are fed into the FAMCAR estimation process typically at regular (for example 1 Hz) epochs. The frequency band coefficients for each of the multi-band measurement combinations needed are computed at 610. The multi-band measurement combinations are input to the Code-Carrier Filter bank 615, the Ionospheric Filter Bank 620, the Auxiliary Code-Carrier Filter Bank 625, and the Geometry Filter 630. The output of the Code-Carrier-, Ionospheric-, and Auxiliary Code-Carrier Filter banks is: Wide-Lane Phase Ambiguities 635, Ionospheric Phase Ambiguities 640, Iono-Free Phase ambiguities 645, respectively. The Geometry filter produces position and iono-free ambiguities which are contained in 650. All position and ambiguities are combined at 655 to produce the final Position & Float Ambiguity L1/L2 estimates 660.

Component Filters
Code-Carrier and Auxiliary Code-Carrier Filters

The Code-Carrier filters and Auxiliary Code-Carrier filters utilize code/carrier combinations that are matched in terms of ionospheric bias. This means that the combinations can be averaged indefinitely without ionospheric bias corrupting the estimated carrier phase ambiguity results. The precision of the carrier phase ambiguity estimates are driven largely by the precision of the underlying code measurements. In particular for the Auxiliary Code-Carrier filters, the uncertainties in the phase ambiguity estimates are typically several cycles even after convergence times of many minutes.

The output of the Code-Carrier-filter banks and the Auxiliary Code-Carrier filter banks includes:
carrier phase ambiguity estimates;
phase combination used;
variance of the carrier phase ambiguity estimates;
associated statistics.

Ionospheric Filters

For GVRS processing, the ionospheric filters are not able to readily estimate the difference in ionospheric bias between server and rover (essentially the absolute ionospheric bias at the rover). Hence, the ionospheric filter results are normally disabled via deweighting (i.e. setting their variances large=1e+4). Note that this contrasts with single-baseline RTK processing where the ionospheric biases can be tightly constrained and therefore accelerate the convergence of the final results.

The output of the Ionospheric filter banks include:
carrier phase ambiguity estimates;
phase combination used;
variance of the carrier phase ambiguity estimates;
associated statistics.

Geometry Filter

The Geometry filter state vector (x) typically includes the following parameters:
rover position $(X_A, Y_A, Z_A)$, given in terms of WGS84 Cartesian coordinates,
receiver clock terms for each satellite system (i.e. $T_G$=GPS clock bias; $T_R$=GLONASS clock bias, etc),
single-difference iono-free (if) carrier phase multipath biases for each satellite ($\Delta_{ij} m^i$, i=1 . . . s),
rover tropospheric scale ($\tau_s$) and optionally east and north tropospheric gradient parameters ($\tau_e, \tau_n$),
single-difference iono-free carrier phase ambiguities for each satellite ($\Delta_{ij} N^i$, i=1 . . . s).

$$x = [X_A\ Y_A\ Z_A\ T_G\ T_R\ \Delta_{ij}m^1\ \Delta_{ij}m^2\ \ldots\ \Delta_{ij}m^s\ \tau_s\ \tau_e\ \tau_n\ \Delta_{ij}N^1\ \Delta_{ij}N^2\ \ldots\ \Delta_{ij}N^s]^T \quad (3)$$

The Geometry filter output includes:
position, carrier phase ambiguity estimates and tropospheric bias parameters;
phase combination used;
variance-covariance matrix for the estimated parameters;
associated statistics.

Geometry Filter Processing Steps

Figure 6:
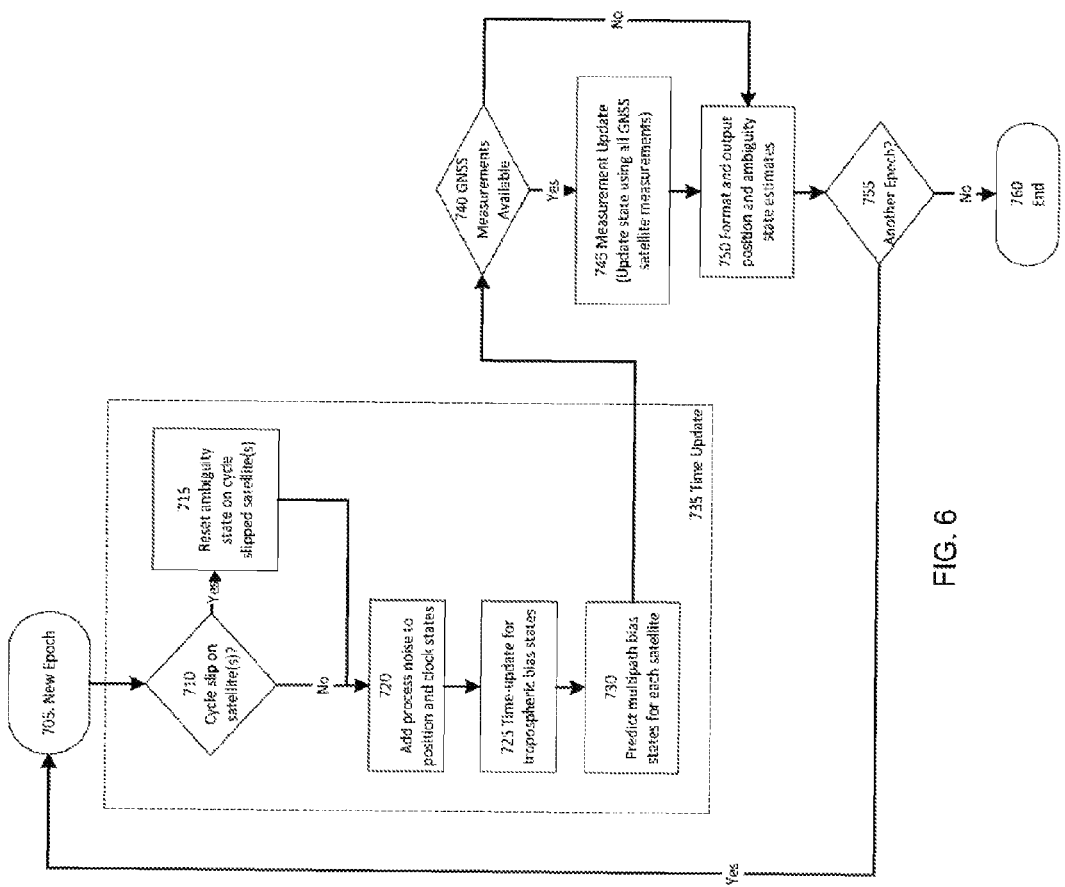
FIG. 6 is a flow chart of geometry filter processing.

FIG. 6 illustrates the processing steps used in the Geometry filter which follow a general Kalman filtering approach. At each new time epoch 705, a time update of the filter occurs 735, involving:

testing for the occurrence of cycle slips (tracking interruptions) on each satellite (710),
initializing the ambiguity state value(s) for any cycle slipped satellite (715),
adding process noise to the position and receiver clock states (720),
adding process noise to the tropospheric bias parameter(s) (725),
predicting the multipath bias state values for each satellite (730).

When GNSS code and phase measurements are available (test 740), they are used to update the filters at 745. The current filter results are made available at 750. Test 755 checks for more epochs to process. If more epochs are available, then the new epoch is handled at 705. Processing is terminated at 760 when no more data is available, i.e. when the rover receiver is turned off.

Filter Combiner

The Filter-Combiner accepts the output of component filters and forms a so-called float solution. That is, the single-difference L1 and L2 carrier phase ambiguities are estimated as floating point numbers. The position of the rover is also derived from the filter combination step. The results of the filter combination are intended to be equivalent to those that would be obtained with an analogous big-filter. i.e. a filter which models state parameters for all unknowns, rather than a distributed filtering scheme.

The position and float (floating-point) carrier phase ambiguities are forwarded on to the iFlex ambiguity search/validation component of the system at each epoch.

iFlex

In traditional carrier phase data processing, the ambiguities are resolved and constrained to a single integer candidate often called the fixed-ambiguity solution. With the carrier phase ambiguities resolved, the precision of the remaining position (and other) parameters is greatly improved. The iFlex scheme takes advantage of the integer-nature of the ambiguities without necessarily enforcing a single integer ambiguity outcome. The overall convergence of the GVRS processing is enhanced by iFlex treatment of the carrier phase ambiguities (refer to International Patent Application PCT/US/2009/004476 filed 5 Aug. 2009 for details of the iFlex technique).

FAMCAR Processing Summary

Figure 7:
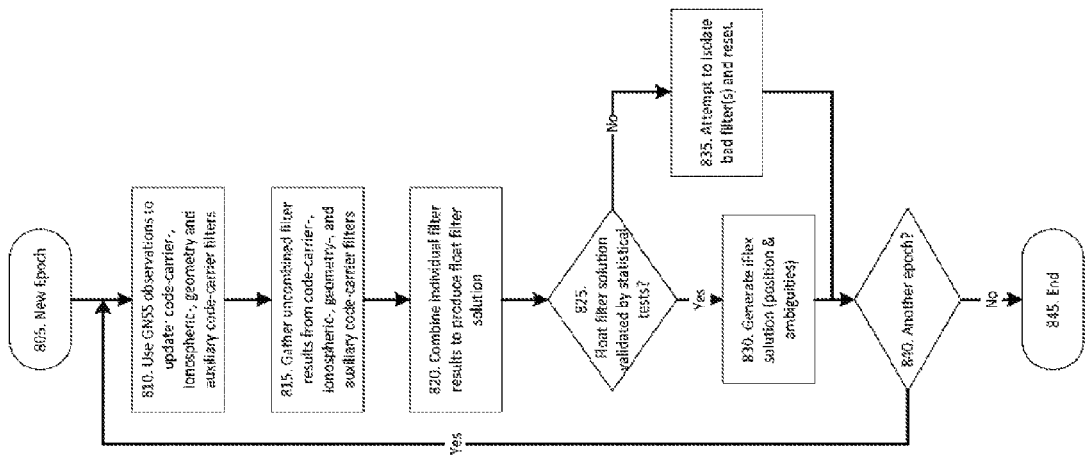
FIG. 7 is a flow chart of epoch processing of GNSS data.

FIG. 7 illustrates the FAMCAR processing steps. At 805 a new epoch of single-difference GNSS data becomes available. The GNSS single-difference observations are used at step 810 to update the Code-Carrier-, Ionospheric-, Auxiliary Code-Carrier-, and Geometry filters. The results from each filter/filter-bank are assembled at 815, and combined at 820 in a least squares sense to form a position and float ambiguity solution. The position and float ambiguity solution is statistically tested at 825 to validate the solution quality. If the solution passes the statistical test(s), An iFlex position and ambiguity solution is generated at 830. If the float solution is deemed bad, then action is taken at 835 to isolate and reset the offending filter(s). The epoch processing loop continues if more data is available (840), otherwise processing is stopped (845).

The unknown parameters estimated in the FAMCAR combination state vector include the following:

$$x = [X_A \ Y_A \ Z_A \ \Delta_{L1}N^1 \ \Delta_{L2}N^1 \Delta_{L1}N^2 \ \Delta_{L2}N^2 \ldots \Delta_{L1}N^s \ \Delta_{L2}N^s]^T \quad (4)$$

where $\Delta_{L1}N^i \ \Delta_{L2}N^i$ are the single-difference L1 and L2 floating point carrier phase ambiguities, for satellites i=1 . . . s.

The uncertainty of the FAMCAR state parameters are contained within the corresponding state covariance matrix.

Troposphere Bridging

Introduction

The troposphere is considered as the lower-part of the atmosphere up to an altitude of approximately 50 km above the earth. The troposphere is composed of dry gasses and water vapour and causes a non-dispersive delay of GNSS radio waves.

Modelling the Tropospheric Bias

Although the dry component of the tropospheric delay can be well modeled via surface measurements of temperature, pressure and relative humidity; the effect of the wet component is more problematic. The wet component can be handled via the estimation of one or more tropospheric scale terms in the state vector of the Geometry filter.

where:

$azim^i$ is the azimuth of satellite i with respect to (with respect to) true north at the rover location, $elev^i$ is the elevation of satellite i with respect to the local horizon plane of the rover.

The tropospheric bias states can be suitably modeled as random walk, autoregressive, or Gauss-Markov processes. Table 2 contains an acceptable model for the tropospheric bias parameters.

The tropospheric states are updated during the Geometry Filter time-update step, as shown by 725 in FIG. 6. When measurement updates are missed (see test 740 in FIG. 6), i.e. when there are data gaps, the uncertainty in the tropospheric parameters is increased by time-update of the Geometry Filter.

The tropospheric parameters re-converge with the application of measurement data. Given the appropriate measurement and system modeling of the tropospheric states, the Kalman filtering process automatically handles tropospheric bridging in the Geometry filter. That is, the change in the satellite tropospheric biases can be accurately predicted across tracking interruptions of several minutes.

TABLE 2

Suitable tropospheric state definition. (ScaleFactor = 0.40)

| Tropospheric State Parameter | System Model Type | Initial State Variance | System Model Parameters |
|---|---|---|---|
| Scale | Random Walk | ScaleFactor * 0.0019 | DrivingNoiseVariance = DeltaTime$^2$ * ScaleFactor * 1.0e−8 |
| East Gradient | First-Order Gauss-Markov | ScaleFactor * 5.0e−6 | CorrelationTime = 1800 sec Correlated Variance = ScaleFactor * 5.0e−6 |
| North Gradient | First-Order Gauss-Markov | ScaleFactor * 5.0e−6 | CorrelationTime = 1800 sec Correlated Variance = ScaleFactor * 5.0e−6 |

The troposphere delay at any given point is often assumed as being isotropic, however experience has shown that weather fronts cause strong spatial biases. Additional east/north gradient components can be estimated in the geometry filter state vector to help address the eolotropic nature of the tropospheric wet delay. Details of horizontal tropospheric gradient estimation using a single GPS receiver are given in Bar-Sever, Y. E, et. al., 1997, *Estimating Horizontal Gradients of Tropospheric Path Delay with a Single GPS Receiver*, submitted to the Journal of Geophysical Research, November 7.

The tropospheric bias is generally slowly changing. Even with the passage of strong weather fronts, the tropospheric bias normally only changes <10 mm/hour$^{1/2}$ [ibid]. The tropospheric bias is therefore well predicted over time once the tropospheric states have converged.

The measurement coefficients for the tropospheric parameters are given by:

Ionospheric Bridging

Introduction

On short-baseline RTK processing, the ionospheric bias is well known and therefore, the ionospheric filter ambiguity estimates are rapidly determined with high precision. The float-ambiguity solution is quickly determined as a result of the high precision ionospheric filter ambiguity estimates. For GVRS processing, the ionospheric filter results are heavily deweighted (essentially ignored) because of a lack of ionospheric bias information. However, once the float solution has converged the ionospheric bias for each observed satellite can be determined as described below.

Once the satellite ionospheric biases have been determined, the ionospheric bridging approach relies on the predictability of the ionosphere to accelerate re-convergence of the float solution immediately following a tracking interruption.

- $\tau_s^i$ = rover tropospheric model delay (scale parameter for satellite $i$),

- $\tau_e^i = \dfrac{\sin(azim^i) * \cos(elev^i)}{[\sin(elev^i)]^2}$ (east gradient parameter for satellite $i$),

- $\tau_n^i = \dfrac{\cos(azim^i) * \cos(elev^i)}{[\sin(elev^i)]^2}$ (north gradient parameter for satellite $i$)

Estimation of Ionospheric Phase Ambiguities

Recall from (4), that the FAMCAR estimation process yields L1 and L2 float(ing point) carrier phase ambiguities for each satellite observed:

$$\Delta_{L1}N^1 \ \Delta_{L2}N^1 \ \Delta_{L1}N^2 \ \Delta_{L2}N^2 \ldots \Delta_{L1}N^s \ \Delta_{L2}N^s$$

The formal precision of the L1 and L2 ambiguities is available from the ambiguity partition ($Q_{nn}$) of the state vector covariance matrix:

$$Q = \begin{bmatrix} Q_{xx} & Q_{xn} \\ Q_{nx} & Q_{nn} \end{bmatrix} \quad (5)$$

where:
$Q_{xx}$ Covariance partition for the position unknowns (3×3);
$Q_{xn}$ Covariance partition for the position/ambiguity unknowns (3×a);
$Q_{nx}$ Covariance partition for the ambiguity/position unknowns (a×3);
$Q_{nn}$ Covariance partition for the ambiguity unknowns (a×a); a number of ambiguity states.

The iFlex processing scheme can be used to generate improved estimates of the state parameters which includes the carrier phase ambiguities. Let the iFlex L1 and L2 ambiguities be denoted with a symbol as follows:

$$\Delta_{L1}\check{N}^1 \ \Delta_{L2}\check{N}^1 \ \Delta_{L1}\check{N}^2 \ \Delta_{L2}\check{N}^2 \ldots \Delta_{L1}\check{N}^s \ \Delta_{L2}\check{N}^s \quad (6)$$

The iFlex scheme can also yield the covariance matrix of the unknown parameters, hence the formal precision of the iFlex ambiguities is known and this allows an assessment to be made as whether or not the iFlex ambiguities are sufficiently close to their true integer values.

With the iFlex carrier phase ambiguities well known, the single-difference ambiguity term on satellite i, can be computed for the ionospheric phase combination as:

$$\Delta_{iono}\check{N}^i = {}_{L1}\lambda_{L1}\check{N}^i - {}_{L2}\lambda_{L2}\check{N}^i \quad (7)$$

The ionospheric biases can be estimated on each single-difference (server-rover) satellite measurement according to:

$$\Delta_{iono}I^i(t) = \Delta_{iono}\Phi^i(t) - \Delta_{iono}N^i(t) - \Delta_{iono}b^i(t) \quad (8)$$

where:
$\Delta_{iono}I^i(t)$—the single-difference ionospheric delay, at time t, for satellite i;
$\Delta_{iono}N^i(t)$—the single-difference ionospheric ambiguity, for satellite i;
$\Delta_{iono}\Phi^i(t)$—the single-difference ionospheric phase at time t, for satellite i;
$\Delta_{iono}b^i(t)$—the single-difference ionospheric phase bias at time t, for satellite i.

The single-difference ionospheric phase bias term ($\Delta_{iono}b^i(t)$) in (8) includes non-integer biases of rover and server, and phase wind-up effects induced on the rover receiver antenna. Phase wind-up effects change with rotation of the rover antenna, however the effect is identical for all satellites observed at the rover and therefore cancel with double-differencing. Server biases are enforced to be constant, through the treatment of the satellite phase clock terms. The single-difference ionospheric ambiguity term ($\Delta_{iono}N^i(t)$) is constant so long as carrier phase tracking is maintained.

The single-difference ionospheric delay ($\Delta_{iono}I^i(t)$) changes with time as the ionospheric bias at the rover changes. Multipath bias is also included in the single-difference ionospheric delay, a component that typically has a magnitude of for example 1-5 cm and a correlation time of 10-60 s.

If tracking is interrupted at the rover, the single-difference ionospheric ambiguity term in (8) changes. The single-difference ionospheric ambiguity term can be re-established after a tracking interruption by using predicted ionospheric delay and observed ionospheric carrier phase:

$$\Delta_{iono}N^i(t_1) = \Delta_{iono}N^i(t_0) + \Delta_{iono}\Phi^i(t_1) - \{\Delta_{iono}\Phi^i(t_0) + \Delta_{iono}I^i(t_1) - \Delta_{iono}I^i(t_0)\} \quad (9)$$

where:
$\Delta_{iono}N^i(t_0)$—single-difference ionospheric ambiguity, at time t0;
$\Delta_{iono}N^i(t)$—single-difference ionospheric ambiguity, at time t1 (iono-bridged ambiguities);
$\Delta_{iono}\Phi^i(t_0)$—single-difference ionospheric phase, observed at time t0;
$\Delta_{iono}\Phi^i(t_1)$—single-difference ionospheric phase, observed at time t1;
$\Delta_{iono}I^i(t_1) - \Delta_{iono}I^i(t_0)$—change in single-difference ionospheric delay between times 0 and 1.

The single-difference ionospheric ambiguity terms ($\Delta_{iono}N^i(t_1)$), for each satellite are used in place of the heavily deweighted ionospheric filter ambiguity estimates in the filter combination step (refer to 640 in FIG. 5). The precision of the resulting float solution is improved by the ionospheric ambiguity aiding.

Predicting the Change in Ionospheric Delay

The variation in the single-difference ionospheric delay over time $[\Delta_{iono}I^i(t_1) - \Delta_{iono}I^i(t_0)]$ should be precisely modeled. The ionosphere is considered as that part of the atmospheric from around 50-1000 km above the earth. Radiation from the sun causes ionization of particles which then result in a frequency-dependent bias on radio waves passing through the medium. The complex physical structure of the ionosphere and the influence of variable solar radiation levels make accurate ionospheric delay modeling difficult. Nevertheless, for the purposes of predicting the ionospheric bias it is possible to just model the variation of the single-difference ionospheric delay for each satellite, without considering the underlying physical causes of the variation.

A simple 2-state Kalman filter can be used to model single-difference ionopheric phase and ionospheric phase rate (these filters are designated as—iono predictor/filters), with a state vector:

$$x = \begin{bmatrix} \Delta_{iono}\Phi^i(t) \\ \Delta_{iono}\dot{\Phi}^i(t) \end{bmatrix} \quad (10)$$

with the state transition matrix (M) defined as:

$$M = \begin{bmatrix} 1 & \Delta t \\ 0 & 1 \end{bmatrix} \quad (11)$$

the system driving noise covariance matrix given by:

$$Q_w = \xi \begin{bmatrix} \Delta t^3/3 & \Delta t^2/2 \\ \Delta t^2/2 & \Delta t \end{bmatrix} \quad (12)$$

where the spectral density of the driving noise ($\xi$) defines the level of filtering applied. A suitable value for $\xi$=4.0e−5.

The measurement model for the filter is defined as:

$$\Delta_{iono}\Phi^i(t) = [1\ 0]\begin{bmatrix}\Delta_{iono}\Phi^i(t)\\ \Delta_{iono}\dot{\Phi}^i(t)\end{bmatrix} + v^i(t) \quad (13)$$

with
$v^i(t)$ measurement residual for satellite i, at time t.

Figure 8:
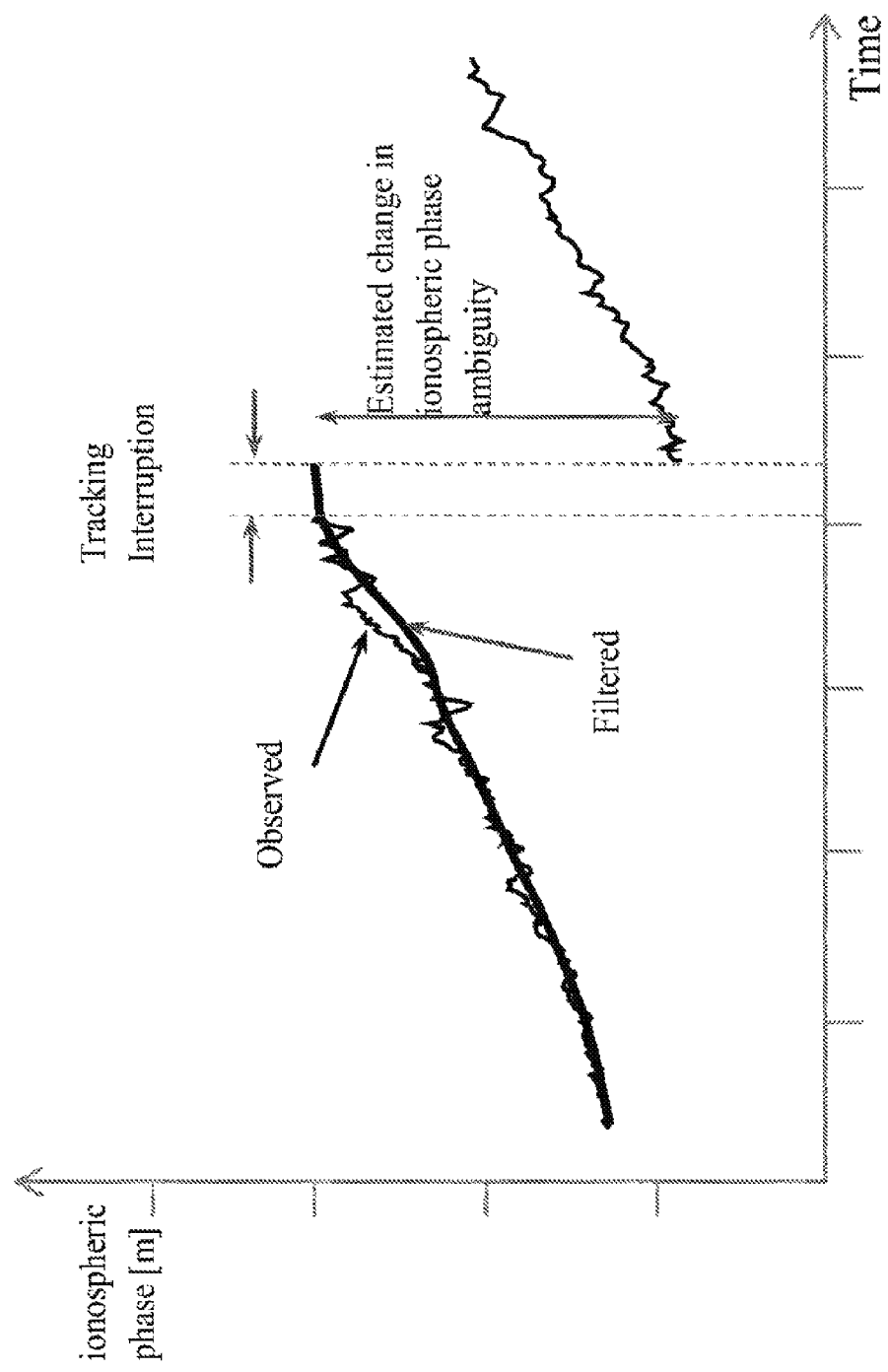
FIG. 8 illustrates observed versus filtered ionospheric phase over time with a tracking interruption.

The Kalman filter provides a way of reducing high-frequency noise on the measurements and enables the prediction of the change in ionospheric phase delay across tracking interruptions. FIG. 8 illustrates the observed ionospheric phase for a single satellite. The variation in the observations is due mainly to changes in the ionospheric delay as well as carrier phase multipath. The filtered estimates track the general trend of the ionospheric phase observations. Immediately following the tracking interruption, the difference between the predicted and actual ionospheric phase measurement provides an estimate of the approximate change in carrier phase ambiguity.

Using the Bridged Ionospheric Ambiguities

Once the rover FAMCAR solution has converged sufficiently and the ionospheric ambiguities are well known, each single-difference satellite ionospheric phase ambiguity is cached. If an outage occurs on tracked satellites, the ionospheric carrier phase ambiguity estimates generated after the tracking outage [$\Delta_{iono}N^i(t_1)$ from (9)] are used to replace the normally deweighted ionospheric filter information (see 640 in FIG. 5).

The precision of the position and ambiguity estimates obtained from the FAMCAR process with ionospheric bridging is far better than those that would derive without bridging.

Figure 9:
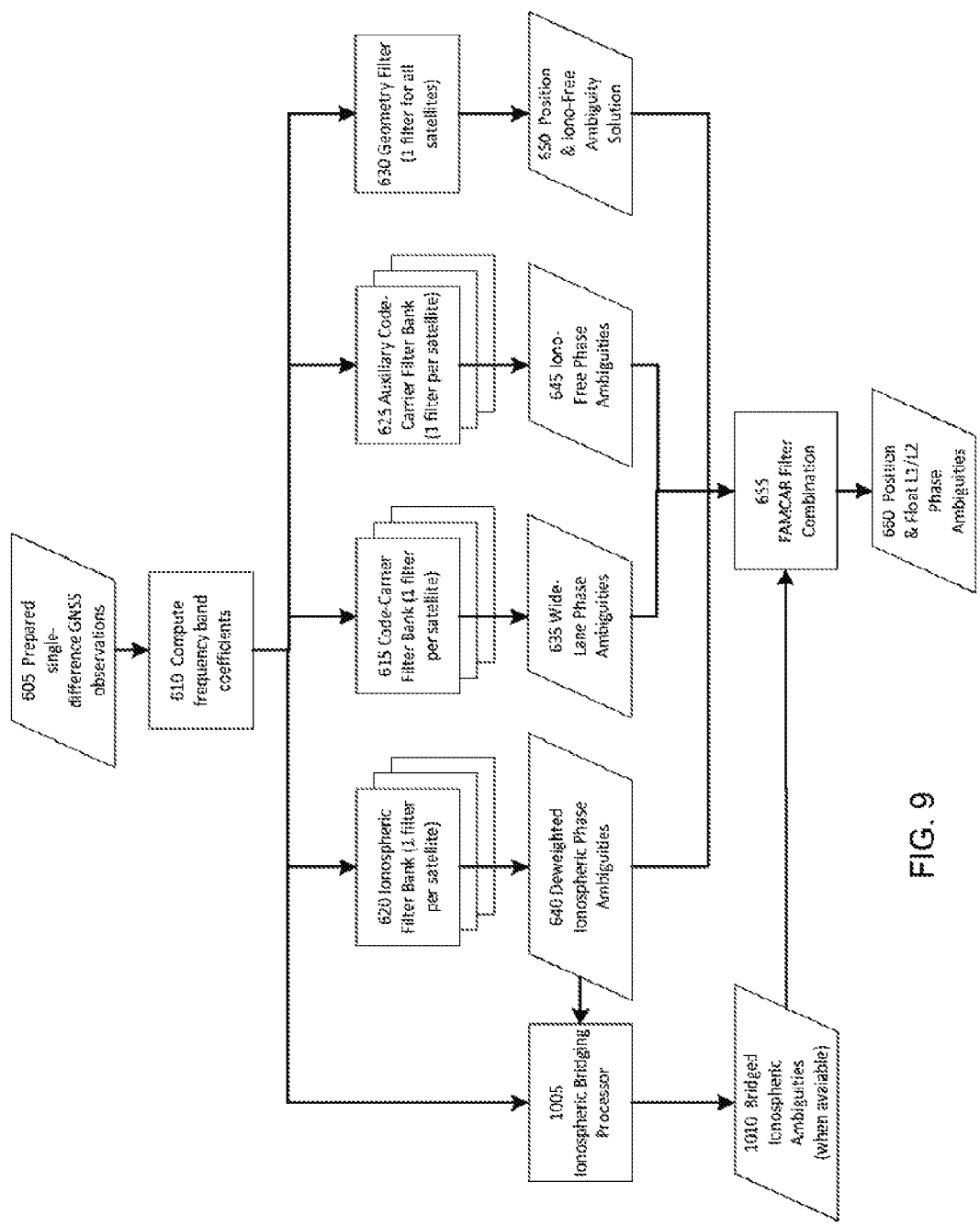
FIG. 9 is a schematic diagram of a FAMCAR filtering scheme with ionospheric bridging in accordance with some embodiments of the invention.

FIG. 9 schematically illustrates the FAMCAR filtering process with iono bridging functionality added. FIG. 9 is an extension of the standard FAMCAR filtering schematic shown in FIG. 5. In FIG. 9, the Ionospheric bridging processor 1005, accepts prepared single-difference GNSS observations, plus the deweighted ionospheric phase ambiguities 640. When ionospheric bridging is needed and possible, the bridged ionospheric ambiguities 1010 are used to replace the deweighted ionospheric phase ambiguities from 640. The bridged ionospheric ambiguities help to improve the FAMCAR float solution produced by the filter combiner at 655.

Bridging Timeout

The bridged ambiguities are applied to the FAMCAR process every epoch immediately following the outage in order to gain rapid re-convergence of the position estimates. However, it is important to limit the amount of time that the bridged ambiguities are applied to the FAMCAR solution. If for example there is an error in one or more of the bridged ambiguities, this error will propagate indefinitely forward and result in position errors of a few centimeters up to several decimeters.

The ionospheric bridging can be stopped as soon as the geometry filter naturally re-converges to a level where the bridged ambiguities no longer provide an improvement to the results.

Detailed Flowchart for Ionospheric Bridging Process

Figure 10:
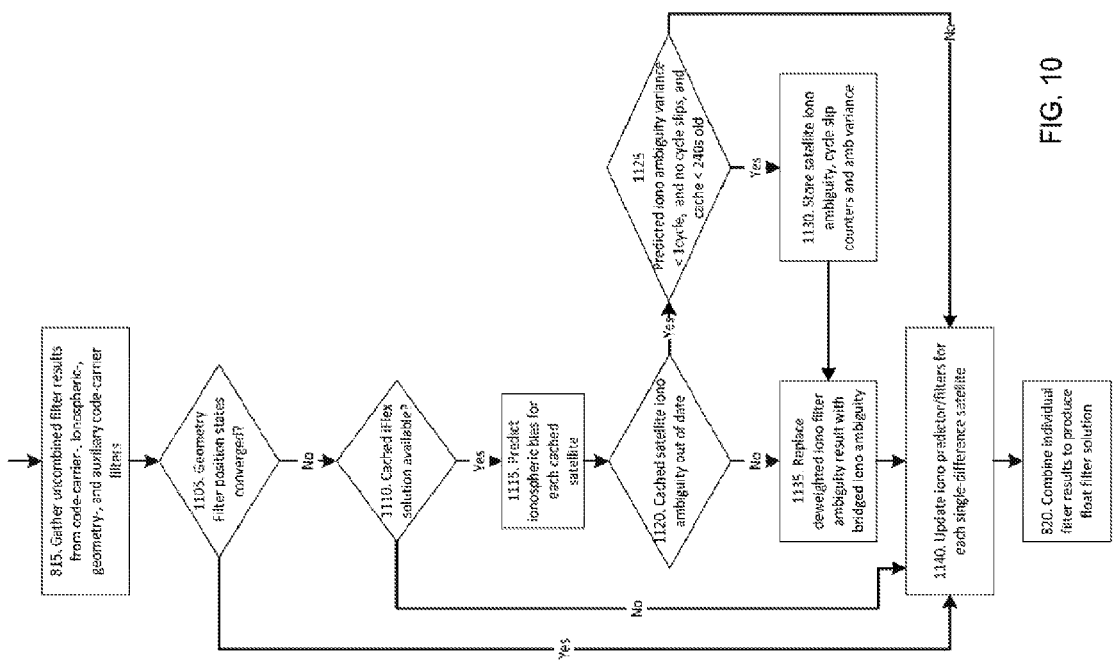
FIG. 10 is a flow chart of ionospheric bridging processing in accordance with some embodiments of the invention.

FIG. 10 contains a detailed flowchart for the ionospheric bridging process. Note that the first step of the ionospheric bridging process (815); and the last step 820, relate to FIG. 8.

The test at 1105 is used to determine if the Geometry filter has converged, if so, then ionospheric bridging is no longer needed. A test is made at 1110 to see if iFlex ambiguities have already been cached. iFlex ambiguities are cached to be able to run the ionospheric bridging process. The ionospheric bias is predicted at 1115 for each cached satellite according to the approach defined by equations 9-13. If the cached ionospheric ambiguities are out of date (test 1120) then a further test is made at 1125 to see if the predicted ionospheric ambiguities are sufficiently well known. If the ionospheric ambiguities are well known, then they are stored at 1130.

The deweighted ionospheric filter ambiguities are replaced by bridged ionospheric ambiguities at 1135, when possible. The ionospheric bias filters are updated for each tracked satellite at 1140. Finally, the FAMCAR filter results are combined at 820.

Figure 11:
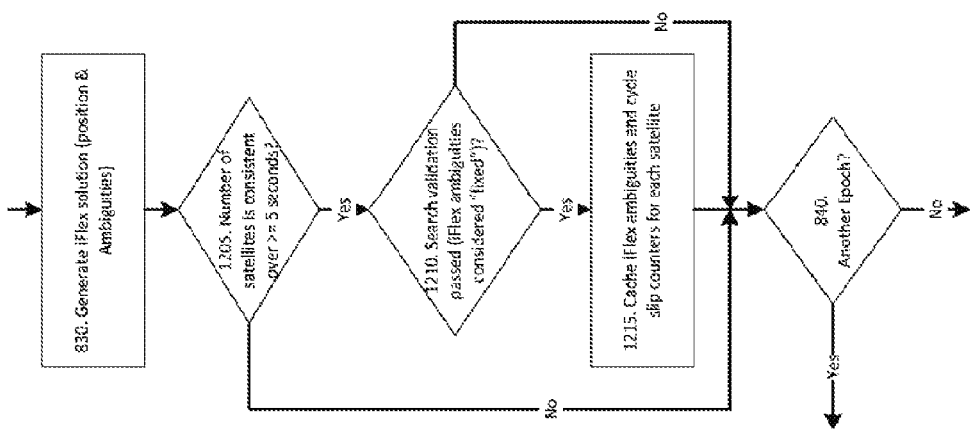
FIG. 11 illustrates a caching process in accordance with some embodiments of the invention.

FIG. 11 presents a flowchart describing the iFlex ambiguity caching process. The flowchart is an expansion of steps 830 and 840 in FIG. 8.

A test is made at 1205 to see if the number of iFlex ambiguities has settled. If the number of satellites is changing, this generally indicates a poor tracking environment and compromised iFlex ambiguity estimates. If the iFlex ambiguities are well known, then they can be assumed to approach a single integer candidate (test 1210) and therefore the iFlex ambiguities can be cached at 1215. The cycle slip counters are stored with the iFlex ambiguities for later use in the iono bridging process.

If the number of satellites tracked is inconsistent, or the iFlex ambiguities are not well enough known, caching is skipped until another epoch of data is processed.

The ionospheric bridging process enables centimeter level horizontal positioning accuracy to be reestablished within 5-30 s after tracking interruptions. Tracking interruptions up to 2 minutes can be readily bridged as long as the ionospheric delays are smoothly changing.

Known Position Techniques

Background Art

Known position initialization techniques have been used since the first RTK products were sold. In a prior-art method Allison, M. T. et al., 1994, Determination of phase ambiguities in satellite ranges, U.S. Pat. No. 5,359,332, Issued October 25, the distance and orientation of a rover antenna relative to a reference antenna is used in the estimation of the carrier phase ambiguities on GNSS signals for the purposes of centimeter level positioning. An apparatus is also described in which an azimuth measuring device is coupled with a fixed distance rover antenna mount. The method and apparatus described focuses on single reference (base) RTK positioning and does not address the estimation process needed for GVRS positioning.

Known Position Input

Introduction

FIG. 12 schematically illustrates a scenario using a GNSS rover with correction data for point surveying. A user 1100 has a rover receiver (rover) 1105 which is mounted on a range pole 1110 or in some cases is a hand-held, or machine-mounted unit without a range pole. Rover 1105 includes a GNSS antenna 1115 and a communications antenna 1120. Rover 1105 receives at its GNSS antenna 1115 the signals from GNSS satellites 1125, 1130, 1135, 1140, 1145, etc. Rover 1105 also receives at its communications antenna 1120 correction data from a corrections source 1150 via a communications link 1155. The communications link is, for example, a radio link or mobile telephone link, or any other suitable means of conveying the correction data to the rover

1105. The correction data can be of any suitable type for improving the positioning accuracy of rover 1105, such as: differential base station data from a base station serving as corrections source 1150, or virtual reference station data from a network of reference stations serving as corrections source 1150 (WAAS is one example), or precise orbits and clocks data from a GVRS service such as that described in U.S. Provisional Application for Patent No. 61/277,184 filed 19 Sep. 2009. In the example of FIG. 12, the phase center of GNSS antenna 1115 is determined and reduced for the height and orientation of the range pole 1110 to the survey point 1160. The position of the rover can be determined at each measurement epoch while static or kinematic. In this example, the location of point 1160 is determined via static occupation, followed by a segment of kinematic positioning, then another static occupation of point 1170. The location of occupied points is often saved as part of a measurement process.

There are several applications that can take advantage of knowledge of the user location in order to reduce solution convergence times. For example, machine control operators from time-to-time need to stop and shut down their machine during meal times or overnight. The position of the machine is therefore often accurately known prior to the tracking interruption. Similarly, a surveyor often measures the location of points of interest via static occupation, separated by periods of kinematic positioning. If tracking is interrupted while moving, the surveyor can return to a previously surveyed mark (like point 1160 or point 1170 in FIG. 12) and restart operation. The use of known position information can accelerate re-convergence of the estimation process.

The Known Position Input scheme presented below is applicable to GVRS rover processing, but it can also be used for single-base, VRS, and all RTK techniques.

Geometry Filter Seeding

The known rover position information can be used to seed the (X,Y,Z) position states of the Geometry Filter via tightly constrained position covariance terms. The known position in this case would help to accelerate the convergence of all states in the Geometry Filter and therefore the overall Float filter and iFlex solution.

The disadvantage of position seeding is that if the input coordinates are incorrect, this will corrupt the Geometry filter into the future, unless the filter is reset.

Known Position Input Via Auxiliary Code-Carrier Filter Aiding

The auxiliary code-carrier filter results can be used to provide a means of inputting position information to the FAMCAR process. An advantage of this approach is that the position aiding process does not alter the underlying filters, but rather is just applied to the output of the Auxiliary Code-Carrier Filters. The position aiding process is analogous to that used for iono-bridging. In the case of position aiding, the Auxiliary Code-Carrier filter results are modified, whereas for iono-bridging, the ionospheric filter results are modified.

The Auxiliary Code-Carrier filter bank normally produces iono-free ambiguity estimates for each tracked satellite based on iono-free code measurements. Iono-free code is inherently noisy and therefore the iono-free ambiguity estimates of the Auxiliary Code-Carrier filters are also noisy and only contribute a small amount of information to the float solution.

When the position of the rover (A) is known, the geometric range from rover to each satellite is given by:

$$\rho_A^i = \sqrt{(x^i - X_A)^2 + (y^i - Y_A)^2 + (z^i - Z_A)^2} \tag{14}$$

where:
$(x^i, y^i, z^i)$ Cartesian WGS84 coordinates of satellite i, given by the satellite ephemeris,
$(X_A, Y_A, Z_A)$ Cartesian WGS84 coordinates of the rover (known position).

The reference receiver (R) location is also known and the geometric range from reference receiver to each satellite is given as:

$$\rho_R^i = \sqrt{(x^i - X_R)^2 + (y^i - Y_R)^2 + (z^i - Z_R)^2} \tag{15}$$

where:
$(X_R, Y_R, Z_R)$ Cartesian WGS84 coordinates of the reference receiver. Note that in the case of GVRS processing, the reference receiver is synthetic, nevertheless the reference receiver coordinates are defined.

The single difference iono-free carrier phase ambiguities are estimated for each satellite via the following equation (with all quantities given in meters):

$$\Delta_{ij} N_{RA}^i = \Delta_{ij} \Phi_{RA}^i - [\Delta \rho_{RA}^i + \Delta \tau_{RA}^i + \Delta \kappa_{RA}] \tag{16}$$

where:
$\Delta_{ij} N_{RA}^i$ single-difference iono-free carrier phase ambiguity for satellite i,
$\Delta_{ij} \Phi_{RA}^i$ single-difference iono-free carrier phase observation for satellite i,
$\Delta \rho_{RA}^i$ single-difference geometric range for satellite i $(\Delta \rho_{RA}^i = \rho_A^i - \rho_R^i)$,
$\Delta \tau_{RA}^i$ single-difference tropospheric bias for satellite i, based on a tropospheric model (e.g. Hopfield, Goad-Goodman, etc), or based on the estimated tropospheric bias parameters from the Geometry Filter,
$\Delta \kappa_{RA}$ single-difference receiver clock bias (=reference receiver clock bias minus the rover receiver clock bias).

The uncertainty of the rover location is expressed in terms of the following position covariance matrix:

$$Q_p = \begin{bmatrix} q_{xx} & q_{xy} & q_{xz} \\ q_{yx} & q_{yy} & q_{yz} \\ q_{zx} & q_{zy} & q_{zz} \end{bmatrix} \tag{17}$$

where $q_{xx}$ refers to the variance of the x-coordinate, $q_{xy}$ refers to the covariance of the x and y coordinates etc.

The variance of the rover-satellite geometric range is obtained by projecting the rover position covariance matrix into the direction of the satellite according to:

$$\sigma_{\rho_A^i}^2 = \begin{bmatrix} a_x^i & a_y^i & a_z^i \end{bmatrix} \begin{bmatrix} q_{xx} & q_{xy} & q_{xz} \\ q_{yx} & q_{yy} & q_{yz} \\ q_{zx} & q_{zy} & q_{zz} \end{bmatrix} \begin{bmatrix} a_x^i \\ a_y^i \\ a_z^i \end{bmatrix} \tag{18}$$

where:

$$a_x^i = \frac{-(x^i - X_A)}{\rho_A^i}$$

Partial derivative of the rover-satellite geometric range with respect to the rover $X_A$ coordinate;

$$a_y^i = \frac{-(y^i - Y_A)}{\rho_A^i}$$

Partial derivative of the rover-satellite geometric range with respect to the rover $Y_A$ coordinate;

$$a_z^i = \frac{-(z^i - Z_A)}{\rho_A^i}$$

Partial derivative of the rover-satellite geometric range with respect to the rover $Z_A$ coordinate.

The variance of the computed single difference iono-free carrier phase ambiguity is computed by applying the law of propagation of variances to (16):

$$\sigma_{\Delta_{ij}N_{RA}^i}^2 = \sigma_{\Delta_{ij}\Phi_{RA}^i}^2 + \sigma_{\Delta\rho_{RA}^i}^2 + \sigma_{\Delta\tau_{RA}^i}^2 + \sigma_{\Delta\kappa_{RA}}^2 \quad (19)$$

where:

$\sigma_{\Delta_{ij}N_{RA}^i}^2$ variance of the single-difference iono-free carrier phase ambiguity for satellite i;

$\sigma_{\Delta_{ij}\Phi_{RA}^i}^2$ variance of the single-difference iono-free carrier phase measurement for satellite i;

$\sigma_{\Delta\rho_{RA}^i}^2$ variance of the single-difference geometric range term for satellite i;

$\sigma_{\Delta\tau_{RA}^i}^2$ variance of the single-difference tropospheric model value for satellite i;

$\sigma_{\Delta\kappa_{RA}}^2$ variance of the single-difference receiver clock bias term.

Normally the dominant errors in (19) relate to the geometric-range term $\sigma_{\Delta\rho_{RA}^i}^2$, and the carrier phase measurement $\sigma_{\Delta_{ij}\Phi_{RA}^i}^2$; the other error sources are often ignored.

FIG. 13 illustrates the use of known position information in the updating of the auxiliary code-carrier filter results. This flowchart is an expansion of steps 815 and 820 in FIG. 7.

The position aiding process is terminated as soon as the geometry filter has sufficiently converged. The geometry filter convergence test is conducted at 1305. If known position is available (1310), then at 1320 ionospheric-free carrier phase ambiguities are computed based on the known position input. The ionospheric-free carrier phase ambiguities are stored to the Geometry Cache as part of step 1320.

It is important to monitor cycle slips in the multi-frequency bands to ensure that the ionospheric-free carrier phase ambiguities stored in the Geometry cache are consistent with the current phase (1325). The Auxiliary Code-Carrier Filter ambiguity results are updated with the Geometry Cached ambiguities in step 1330. The results of the Auxiliary Code-Carrier Filters are posted at 1335, and used in the FAMCAR combination step 820.

FIG. 14 schematically describes the FAMCAR filtering process with position aiding FIG. 14 is derived from the standard FAMCAR filtering process shown in FIG. 5. The known position processor, 1405, accepts single-differenced ionospheric-free phase data from 605/610, plus the ionospheric-free phase ambiguities 645 produced by the Auxiliary Code-Carrier Filter bank 625. When known position information 1402 is provided to the known position processor, it produces ionospheric-free phase ambiguities that replace those produced by the Auxiliary Code-Carrier Filter bank (1410). The known position aided ambiguities are used in the FAMCAR combination step 655. Finally, the position and float ambiguity estimates are reported at step 660.

Known Position Input Via Code-Carrier Filters

The low accuracy of the Auxiliary Code-Carrier Filter ambiguity results normally means that they don't contribute significantly to the final FAMCAR combined float solution. This makes the Auxiliary Code-Carrier Filter results well suited to use for known position input. Furthermore, the iono-free carrier phase combination used in the Auxiliary Code-Carrier Filters, means that the known position range computations can be formed without being impacted by ionospheric bias. Ionospheric bias is a significant error source for GVRS processing.

The known position input could also be handled by modifying the Code-Carrier Filter results, in a manner which is analogous to that used in the Auxiliary Code-Carrier Filter results. The disadvantage of this approach is that the Code-Carrier Filters nominally use the wide-lane carrier phase combination, which contains an ionospheric bias. Second, the code-carrier filter results contribute significantly to the FAMCAR combined float solution therefore this information would be compromised if replaced by the known position input.

Rather than replacing the Auxiliary Code-Carrier Filter results with known position information, an alternative is to generate a parallel bank of Auxiliary Code-Carrier Filter results devoted to known position information input.

Termination of the Known Position Aiding Process

The known position aiding process outlined does not corrupt any FAMCAR component filter, just the uncombined filter results (output) are modified prior to the FAMCAR filter combination step. The known position aiding process is automatically terminated when:

The known position is deemed to be incorrect;

The Geometry filter has converged sufficiently that the known position aiding is no longer required.

The known position information is deemed suspect or incorrect if the float/iFlex solution fails a statistical test of the mean and/or variance.

When the position states of the Geometry filter have converged, i.e. all variances < for example 0.002 m². In this case, the position aiding no longer adds significant information to the float solution.

Performance of Known Position Input processing

Figure 1:
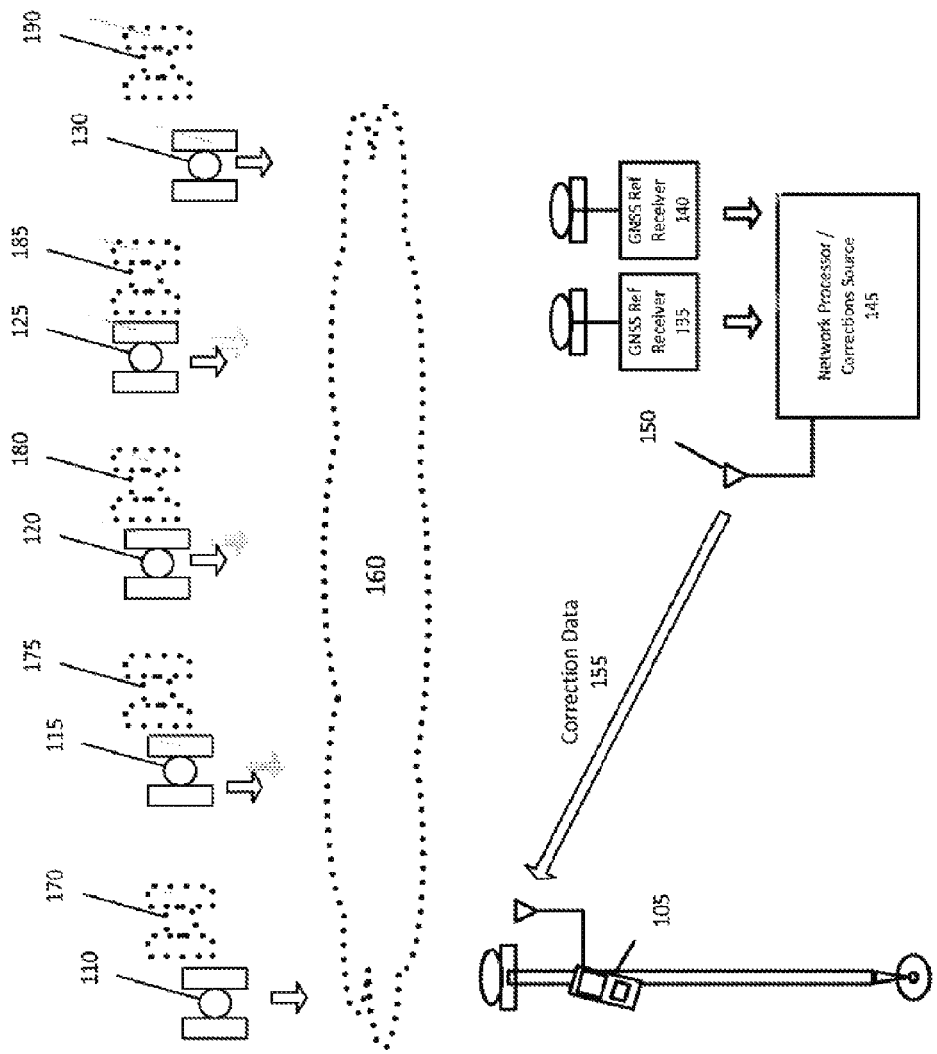
Figure 2:
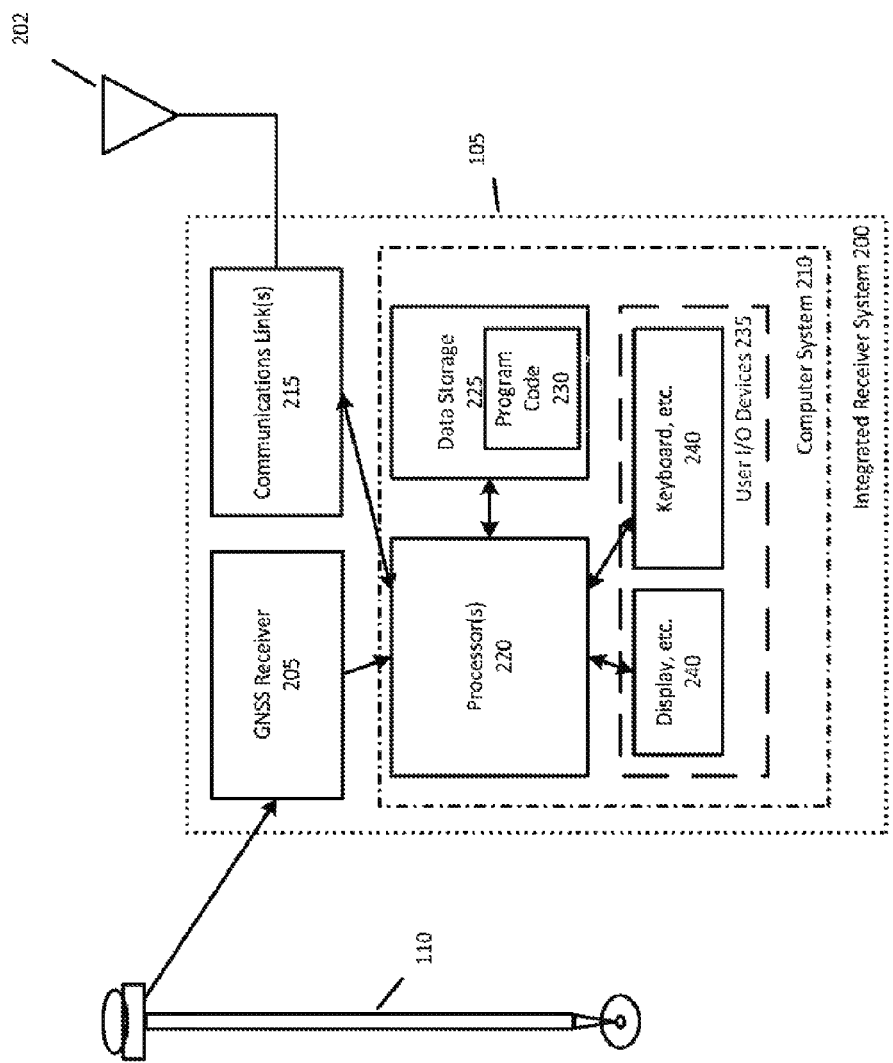
Figure 3:
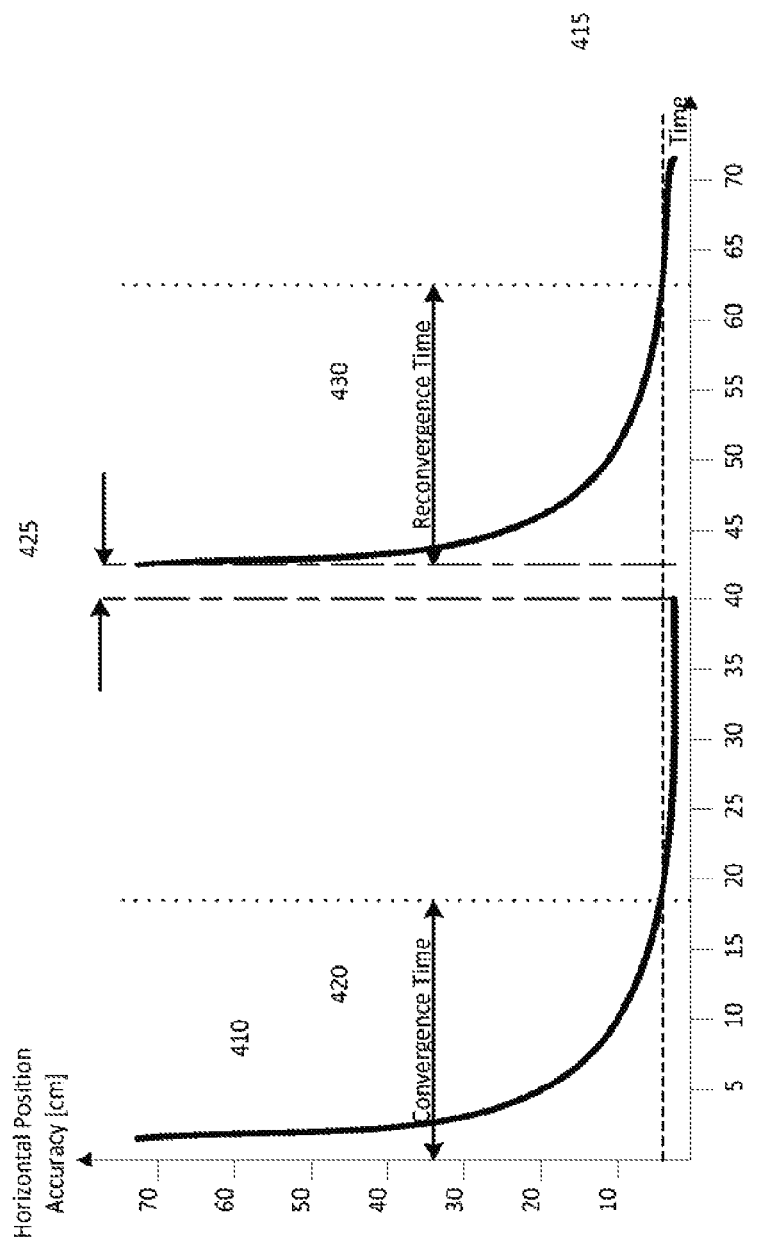

As illustrated in FIG. 3, convergence and re-convergence of the horizontal position accuracy can take 15-20 minutes to achieve centimeter-level. With known position input, the convergence time is normally reduced to a few seconds up to for example 1 minute.

Following is a summary of some of the inventive concepts described herein:

[Iono Bridging]

1. A positioning method, comprising
   a. Obtaining GNSS data derived from multi-frequency signals received at a rover antenna,
   b. Obtaining correction data derived from a network of reference stations,
   c. At each of a plurality of epochs, using the GNSS data and the correction data to estimate values defining a rover antenna position and a set of multi-frequency ambiguities,
   d. Using an ionospheric filter to model variation in ionospheric bias per satellite,
   e. Estimating a set of ionospheric carrier-phase ambiguities at least when the multi-frequency ambiguities have attained a predetermined precision,
   f. Caching the estimated ionospheric carrier-phase ambiguities,
   g. Detecting an interruption of signal received at the rover antenna,
   h. Determining reacquisition of signals received at the rover antenna,
   i. Predicting an ionospheric bias per satellite over an interruption interval, j. For each satellite, combining a cached ionospheric carrier-phase ambiguity with a predicted ionospheric bias to obtain a post-interruption ionospheric ambiguity estimate, k. Using the post-interruption ionospheric ambiguity estimates to aid estimation of at least a rover antenna position subsequent to the reacquisition.

2. The method of 1, wherein aiding comprises, at each of a plurality of epochs after reacquisition of signals, using the GNSS data and the correction data and the post-interruption iono ambiguity estimates to estimate values defining an aided rover antenna position and an aided set of multi-frequency ambiguities.

3. The method of 2, further comprising determining a precision of the post-interruption rover antenna position and of each of the multi-frequency ambiguities.

4. The method of 3, wherein when the precisions of the post-interruption rover antenna position and of each of the multi-frequency ambiguities has achieved a predetermined threshold, using the post-interruption ionospheric ambiguity estimates to aid estimation is terminated.

5. The method of one of 1-4, wherein rover-satellite ionospheric biases are substantially uncorrelated with reference station-satellite ionospheric biases.

6. The method of one of 1-5, wherein the ionospheric filter models an ionospheric bias per satellite which is single-differenced between rover data and correction data.

7. The method of one of 1-6, wherein the set of ionospheric carrier-phase ambiguities comprises a single-differenced ionospheric ambiguity per satellite.

8. The method of one of 1-7, wherein detecting an interruption comprises determining that fewer than four satellites are continuously observed over a predetermined interval.

9. The method of one of 1-8, wherein determining reacquisition comprises determining that at least four satellites are continuously observed over a predetermined interval.

10. The method of one of 1-9, wherein the estimated rover antenna position has a precision which is better than a precision that would be obtained without use of the generated set of ionospheric ambiguity estimates.

11. The method of one of 1-10, further comprising terminating using the post-interruption ionospheric ambiguity estimates to aid estimation when substantially no further benefit is obtained therefrom.

12. The method of one of 1-11, wherein the values defining the rover antenna position are estimated in a filter, the method further comprising monitoring precisions of the values estimated and terminating using the post-interruption ionospheric ambiguity estimates to aid estimation of rover antenna position when a precision threshold is achieved for values defining the rover position.

13. The method of one of 10-11 wherein terminating using the post-interruption ionospheric ambiguity estimates to aid estimation of rover antenna position comprises continuing to use the GNSS data and the correction data to estimate values defining a rover antenna position.

14. The method of one of 1-13, further comprising predicting tropospheric bias and using predicted tropospheric bias to aid the estimation of at least a rover antenna position subsequent to the reacquisition.

15. The method of one of 1-14, wherein the set of ionospheric carrier-phase ambiguities is determined as a weighted average of integer ambiguity candidate sets.

16. The method of one of 1-15, wherein caching of the estimated ionospheric phase ambiguities is deferred until satellite tracking is determined to be stable and within predetermined parameters.

17. The method of one of 1-16, further comprising estimating time-wise variation of an ionospheric bias per satellite.

18. The method of one of 1-17, further comprising estimating a change in ionospheric carrier-phase ambiguities after detecting an interruption of signal received at the rover antenna.

19. The method of one of 1-18, wherein using the post-interruption ionospheric ambiguity estimates to aid estimation of at least a rover antenna position subsequent to the reacquisition comprises combining the post-interruption ionospheric ambiguity estimates with estimates of other parameters from a set of factorized filters.

20. The method of 19, wherein the post-interruption ionospheric ambiguity estimates are substituted for estimates from a bank of ionospheric filters.

21. Apparatus for performing a method according to one of 1-20.

22. A computer program comprising instructions for causing an apparatus to perform a method according to one of 1-20.

23. A computer program product comprising a tangible computer-readable medium embodying instructions for causing an apparatus to perform a method according to one of 1-20.

[Known Position]

1. A positioning method, comprising
    a. Obtaining GNSS data derived from multi-frequency signals received at a rover antenna,
    b. Obtaining correction data derived from a network of reference stations,
    c. At each of a plurality of epochs, using the GNSS data and the correction data to estimate values defining a rover antenna position and a set of multi-frequency ambiguities,
    d. Estimating an ionospheric-free carrier-phase ambiguity per satellite based on a known rover antenna position, and
    e. Using the estimated ionospheric-free carrier-phase ambiguities to assist in determining an aided rover antenna position.

2. The method of 1, wherein using the estimated ionospheric-free carrier-phase ambiguities to assist in determining an aided rover antenna position comprises combining the estimated ionospheric-free carrier-phase ambiguity with an estimated widelane ambiguity and with an estimated ionospheric-free ambiguity and with values defining the known rover antenna position to obtain values defining an aided rover antenna position and aided multi-frequency ambiguities.

3. The method of one of 1-2, further comprising terminating using the estimated ionospheric-free carrier-phase ambiguities to assist in determining an aided rover antenna position when substantially no further benefit is obtained therefrom.

4. The method of one of 1-3, further comprising monitoring precision of an unaided rover antenna position estimate to determine when substantially no further benefit is obtained from using the estimated ionospheric-free carrier-phase ambiguities to assist in determining an aided rover antenna position.

5. The method of one of 2-4, wherein the widelane ambiguities are estimated in a set of code-carrier filters.

6. The method of one of 2-5, wherein the ionospheric-free ambiguities are estimated in a geometry filter.

7. The method of one of 1-6, wherein the ionospheric-free carrier-phase ambiguity per satellite based on a known rover antenna position is computed using the known rover antenna position and observed carrier-phase measurements.

8. The method of one of 1-7, wherein the ionospheric-free carrier-phase ambiguity for at least one satellite based on a known rover antenna position is improved using a prevailing tropospheric bias on the respective satellite.

9. The method of one of 1-8, wherein using the estimated ionospheric-free carrier-phase ambiguities to assist in determining an aided rover antenna position estimated ionospheric-free carrier-phase ambiguity estimates with estimates of other parameters from a set of factorized filters.

10. The method of 9, wherein the estimated ionospheric-free carrier-phase ambiguity estimates are substituted for estimates from a bank of auxiliary code-carrier filters.

11. The method of 10, further comprising creating a separate bank of auxiliary code carrier filter results for the known position results so that normal auxiliary code carrier filter results remain unaffected.

12. Apparatus for performing a method according to one of 1-11.

13. A computer program comprising instructions for causing an apparatus to perform a method according to one of 1-11.

14. A computer program product comprising a tangible computer-readable medium embodying instructions for causing an apparatus to perform a method according to one of 1-11.

The foregoing description of embodiments is not intended as limiting the scope of but rather to provide examples of the invention as defined by the claims.

The invention claimed is:

1. A method of estimating a position of a rover antenna using a computer processor, the method comprising:
    receiving GNSS data derived from multi-frequency signals received at the rover antenna over a plurality of epochs;
    receiving correction data for the GNSS data from a network of reference stations over the plurality of epochs;
    at each of the plurality of epochs, estimating values defining a rover antenna position and a set of multi-frequency ambiguities using the GNSS data and the correction data;
    modeling variation in ionospheric bias per satellite using an ionospheric filter;
    estimating a set of ionospheric carrier-phase ambiguities;
    upon determining that the set of ionospheric carrier-phase ambiguities have converged, caching the set of ionospheric carrier-phase ambiguities;
    detecting an interruption of signal received at the rover antenna;
    determining reacquisition of signals received at the rover antenna;
    predicting an ionospheric bias per satellite over an interruption interval;
    for each satellite, combining a cached ionospheric carrier-phase ambiguity with the predicted ionospheric bias to obtain a post-interruption ionospheric ambiguity estimate; and
    estimating a position of the rover antenna subsequent to the reacquisition using the post-interruption ionospheric ambiguity estimates.

2. The method of claim 1, wherein estimating the position of the rover antenna position subsequent to the reacquisition comprises, at each of a plurality of epochs after reacquisition of signals, using the GNSS data, the correction data, and the post-interruption ionospheric ambiguity estimates to estimate values defining an aided rover antenna position and an aided set of multi-frequency ambiguities.

3. The method of claim 2, further comprising determining an accuracy of the post-interruption rover antenna position and an accuracy of each of the multi-frequency ambiguities.

4. The method of claim 3, further comprising, upon determining that the accuracy of the post-interruption rover antenna position and the accuracy of each of the multi-frequency ambiguities has each achieved a predetermined level, terminating the estimation of the position of the rover antenna position subsequent to the reacquisition.

5. The method of claim 4, wherein the values defining the rover antenna position are estimated in a filter, the method further comprising monitoring accuracies of the estimated values and terminating the estimation of the values when a predetermined accuracy level is achieved.

6. The method of claim 5, further comprising continuing the estimation of the values defining a rover antenna position after terminating the estimation of the position of the rover antenna position subsequent to the reacquisition.

7. The method of claim 1, wherein rover-satellite ionospheric biases are substantially uncorrelated with reference station-satellite ionospheric biases.

8. The method of claim 1, wherein the ionospheric filter models an ionospheric bias per satellite which is single-differenced between rover data and correction data.

9. The method of claim 1, wherein the set of ionospheric carrier-phase ambiguities comprises a single-differenced ionospheric ambiguity per satellite.

10. The method of claim 1, wherein detecting the interruption comprises determining that fewer than four satellites are continuously observed over a predetermined interval.

11. The method of claim 1, wherein determining the reacquisition comprises determining that at least four satellites are continuously observed over a predetermined interval.

12. The method of claim 1, wherein the estimated rover antenna position subsequent to the reacquisition has a precision which is better than a precision that would be obtained without use of the post-interruption ionospheric ambiguity estimates.

13. The method of claim 1, further comprising predicting a tropospheric bias, and wherein the predicted tropospheric bias is used in the estimation of the rover antenna position subsequent to the reacquisition.

14. The method of claim 1, wherein the set of ionospheric carrier-phase ambiguities is estimated as a weighted average of integer ambiguity candidate sets.

15. The method of claim 1, further comprising deferring caching of the estimated ionospheric phase ambiguities until satellite tracking is determined to be stable and within predetermined parameters.

16. The method of 1, further comprising estimating time-wise variation of an ionospheric bias per satellite.

17. The method of claim 1, further comprising estimating a change in ionospheric carrier-phase ambiguities after detecting an interruption of signal received at the rover antenna.

18. The method of claim 1, wherein estimating the position of the rover antenna subsequent to reacquisition comprises combining the post-interruption ionospheric ambiguity estimates with estimates of other parameters from a set of factorized filters.

19. The method of claim 18, wherein the post-interruption ionospheric ambiguity estimates are substituted for estimates from a bank of ionospheric filters.

20. An apparatus comprising:
a receiver configured to:
  receive GNSS data derived from multi-frequency signals received at a rover antenna; and
  receive correction data for the GNSS data derived from a network of reference stations; and
a processor coupled to the receiver, the processor configured to:
  at each of a plurality of epochs, estimate values defining a rover antenna position and a set of multi-frequency ambiguities using the GNSS data and the correction data;
  model variation in ionospheric bias per satellite using an ionospheric filter;
  estimate a set of ionospheric carrier-phase ambiguities until the multi-frequency ambiguities have converged;
  cache the estimated ionospheric carrier-phase ambiguities;
  detect an interruption of signal received at the rover antenna;
  determine reacquisition of signals received at the rover antenna;
  predict an ionospheric bias per satellite over an interruption interval;
  for each satellite, combine a cached ionospheric carrier-phase ambiguity with a predicted ionospheric bias to obtain a post-interruption ionospheric ambiguity estimate; and
  estimate a position of the rover antenna subsequent to the reacquisition using the post-interruption ionospheric ambiguity estimates.

21. The apparatus of claim 20, wherein estimating the position of the rover antenna subsequent to the reacquisition comprises, at each of a plurality of epochs after reacquisition of signals, using the GNSS data and the correction data and the post-interruption ionospheric ambiguity estimates to estimate values defining an aided rover antenna position and an aided set of multi-frequency ambiguities.

22. The apparatus of claim 21, wherein the processor is further configured to determine an accuracy of the position of the rover antenna subsequent to the reacquisition and an accuracy of each of the multi-frequency ambiguities.

23. The apparatus of claim 22, wherein the processor is further configured to terminate the estimation of the position of the rover antenna subsequent to the reacquisition when the accuracy of the position of the rover antenna subsequent to the reacquisition and the accuracy of each of the multi-frequency ambiguities has each achieved a predetermined level.

24. The apparatus of claim 23, wherein the values defining the position of the rover antenna are estimated in a filter operated by the processor, wherein the processor is further configured to monitor precisions of the estimated values and to terminate the estimation of the values when the precisions of the values have reached a predetermined level.

25. The apparatus of claim 24, wherein the processor is further configured to continue estimating values defining a rover antenna position after terminating the estimation of the position of the rover antenna subsequent to the reacquisition.

26. The apparatus of claim 20, wherein rover-satellite ionospheric biases are substantially uncorrelated with reference station-satellite ionospheric biases.

27. The apparatus of claim 20, wherein the ionospheric filter models an ionospheric bias per satellite which is single-differenced between rover data and correction data.

28. The apparatus of claim 20, wherein the set of ionospheric carrier-phase ambiguities comprises a single-differenced ionospheric ambiguity per satellite.

29. The apparatus of claim 20, wherein detecting an interruption comprises determining that fewer than four satellites are continuously observed over a predetermined interval.

30. The apparatus of claim 20, wherein determining reacquisition comprises determining that at least four satellites are continuously observed over a predetermined interval.

31. The apparatus of claim 20, wherein the estimated position of the rover antenna subsequent to the reacquisition has a precision which is better than a precision that would be obtained without use of the post-interruption ionospheric ambiguity estimates.

32. The apparatus of claim 20, wherein the processor is further configured to predict tropospheric bias, and wherein the predicted tropospheric bias is used in the estimation of the rover antenna position subsequent to the reacquisition.

33. The apparatus of claim 20, wherein the processor determines the set of ionospheric carrier-phase ambiguities as a weighted average of integer ambiguity candidate sets.

34. The apparatus of claim 20, wherein caching of the estimated ionospheric phase ambiguities is deferred until the processor determines satellite tracking to be stable and within predetermined parameters.

35. The apparatus of claim 20, wherein the processor is further configured to estimate time-wise variation of an ionospheric bias per satellite.

36. The apparatus of claim 20, wherein the processor is further configured to estimate a change in ionospheric carrier-phase ambiguities after detecting an interruption of signal received at the rover antenna.

37. The apparatus of claim 20, wherein estimating the position of the rover antenna subsequent to reacquisition comprises combining the post-interruption ionospheric ambiguity estimates with estimates of other parameters from a set of factorized filters.

38. The apparatus of claim 20, wherein the processor is further configured to substitute the post-interruption ionospheric ambiguity estimates for estimates from a bank of ionospheric filters.

39. A computer program product comprising a non-transitory computer-readable medium embodying instructions for causing an apparatus to perform the method of claim 1.

* * * * *